(12) United States Patent
Furukawa et al.

(10) Patent No.: US 11,201,559 B2
(45) Date of Patent: Dec. 14, 2021

(54) POWER CONVERSION DEVICE AND POWER CONVERSION DEVICE CONNECTION METHOD

(71) Applicant: Hitachi, Ltd., Tokyo (JP)

(72) Inventors: Kimihisa Furukawa, Tokyo (JP); Yuuichi Mabuchi, Tokyo (JP); Yuki Kawaguchi, Tokyo (JP); Akihiko Kanouda, Tokyo (JP)

(73) Assignee: Hitachi, Ltd., Tokyo (JP)

( * ) Notice: Subject to any disclaimer, the term of this patent is extended or adjusted under 35 U.S.C. 154(b) by 77 days.

(21) Appl. No.: 16/617,875

(22) PCT Filed: Jun. 14, 2017

(86) PCT No.: PCT/JP2017/022016
§ 371 (c)(1),
(2) Date: Nov. 27, 2019

(87) PCT Pub. No.: WO2018/229915
PCT Pub. Date: Dec. 20, 2018

(65) Prior Publication Data
US 2021/0143744 A1    May 13, 2021

(51) Int. Cl.
*H02M 5/458* (2006.01)
*H02M 1/00* (2006.01)

(52) U.S. Cl.
CPC ............ *H02M 5/4585* (2013.01); *H02M 1/00* (2013.01); *H02M 1/0077* (2021.05)

(58) Field of Classification Search
CPC ........................................ H02M 5/458–459
See application file for complete search history.

(56) References Cited

U.S. PATENT DOCUMENTS

2010/0295383 A1    11/2010  Cummings
2016/0079879 A1*   3/2016   Ronner ................. H02M 5/458
                                              363/35

FOREIGN PATENT DOCUMENTS

JP   2005-73362 A    3/2005
JP   2007-20384 A1   1/2007
(Continued)

OTHER PUBLICATIONS

International Search Report (PCT/ISA/210) issued in PCT Application No. PCT/JP2017/022016 dated Aug. 22, 2017 with English translation (two (2) pages).
(Continued)

*Primary Examiner* — Thienvu V Tran
*Assistant Examiner* — Nusrat Quddus
(74) *Attorney, Agent, or Firm* — Crowell & Moring LLP

(57) ABSTRACT

The power conversion device includes multiple converter cells. Each converter cell includes a pair of primary-side terminals and a pair of secondary-side terminals. The converter cell transmits power between the pair of primary-side terminals and the pair of secondary-side terminals. The primary-side terminals of the multiple converter cells are connected in series to a primary-side power supply system. The secondary-side terminals of the multiple converter cells are connected in series to a secondary-side power supply system. Among the multiple converter cells, the converter cell in which an absolute value of a ground voltage appearing in the pair of primary-side terminals is the highest is different from the converter cell in which an absolute value of a ground voltage appearing in the pair of secondary-side terminals is the highest.

5 Claims, 18 Drawing Sheets

(56) References Cited

FOREIGN PATENT DOCUMENTS

WO     WO 2016-177399     *    5/2015
WO     WO 2017/073150 A1    5/2017

OTHER PUBLICATIONS

Japanese-language Written Opinion (PCT/ISA/237) issued in PCT Application No. PCT/JP2017/022016 dated Aug. 22, 2017 (three (3) pages).

* cited by examiner

OPERATING MODE M1

OPERATING MODE M2

OPERATING MODE M3

OPERATING MODE M4

POWER CONVERSION DEVICE AND POWER CONVERSION DEVICE CONNECTION METHOD

TECHNICAL FIELD

The present invention relates to a power conversion device and a power conversion device connection method.

BACKGROUND ART

As the background art related to this technical field, Patent Literature 1 listed below states "As shown, in the power conversion device 1 according to a first aspect of the present invention includes multiple converter cells 20-1, 20-2, . . . , 20-N (N is an integer of 2 or more). The alternating-current sides of the first AC-DC converters 11 of the multiple converter cells 20-1, 20-2, . . . , 20-N are connected to one another in series, while the alternating-current sides of the fourth AC-DC converters 14 of the multiple converter cells are connected to one another in series. As the number of converter cells connected to one another in series becomes larger, the alternating voltage is more multi-leveled" (see paragraph 0019 in the specification).

CITATION LIST

Patent Literature

Patent Literature 1: JP 2005-073362 A

SUMMARY OF INVENTION

Technical Problem

The technique disclosed in Patent Literature 1, however, increases a potential difference between the primary side (the alternating-current sides of the respective first AC-DC converters 11) and the secondary side (the alternating-current sides of the respective fourth AC-DC converters 14). This requires higher breakdown voltages of a transformer and the like provided within each converter cell, and accordingly causes a problem of increases in the size and cost of the converter cell.

The present invention has been made with the above situation taken into consideration. An object of the present invention is to provide a power conversion device which can be constructed in a smaller size and at a lower cost, and a power conversion device connection method applied to the same.

Solution to Problem

To solve the above problems, a power conversion device according to the present invention is characterized as follows.

The power conversion device includes multiple converter cells. Each converter cell includes a pair of primary-side terminals and a pair of secondary-side terminals. The converter cell transmits power between the pair of primary-side terminals and the pair of secondary-side terminals. The primary-side terminals of the multiple converter cells are connected in series to a primary-side power supply system. The secondary-side terminals of the multiple converter cells are connected in series to a secondary-side power supply system. Among the multiple converter cells, the converter cell in which an absolute value of a ground voltage appearing in the pair of primary-side terminals is the highest is different from the converter cell in which an absolute value of a ground voltage appearing in the pair of secondary-side terminals is the highest.

Advantageous Effects of Invention

The present invention can realize a smaller-size, lower-cost power conversion device.

DESCRIPTION OF EMBODIMENTS

First Embodiment

Configuration of First Embodiment

First of all, descriptions will be provided for a configuration of a power conversion device according to a first embodiment of the present invention.

Figure 1:
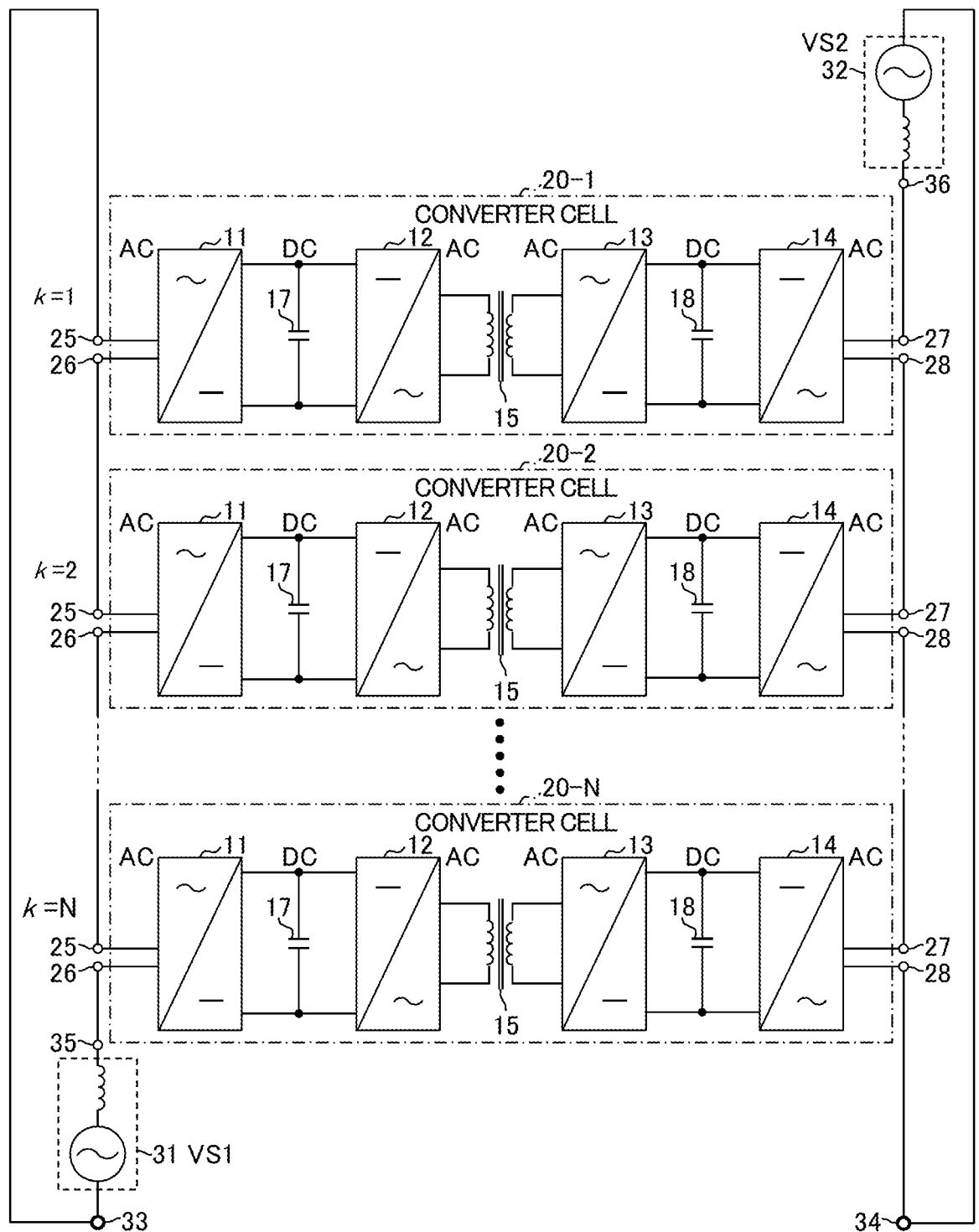
FIG. 1 is a block diagram of a power conversion device 1 according to a first embodiment of the present invention.

FIG. 1 is a block diagram of the power conversion device 1 according to the first embodiment of the present invention. The power conversion device 1 includes N converter cells 20-1 to 20-N (N is an integer of 2 or more). Each converter cell 20-$k$ ($k$ represents a stage number, and $1 \leq k \leq N$) includes a pair of primary-side terminals 25, 26, a pair of secondary-side terminals 27, 28, an AC-DC converter 11 (a first AC-DC converter, a primary-side converter), an AC-DC converter 12 (a second AC-DC converter, a primary-side converter), an AC-DC converter 13 (a third AC-DC converter, a secondary-side converter), an AC-DC converter 14 (a fourth AC-DC converter, a secondary-side converter), a high-frequency transformer 15 (shortened to trans) and capacitors 17, 18.

Furthermore, the primary-side terminals 25, 26 of the converter cells 20-1 to 20-N are connected to one another in series, and a primary-side power supply system 31 is connected to the series circuit. Meanwhile, the secondary-side terminals 27, 28 of the converter cells 20-1 to 20-N are connected to one another in series, and a secondary-side power supply system 32 is connected to the series circuit. Each of the converter cells 20-1 to 20-N transmits power between the primary-side terminals 25, 26 and the secondary-side terminals 27, 28 in bilateral directions or in a unilateral direction. The primary- and secondary-side power supply systems 31, 32 each internally include inductive impedance or a filter reactor. Moreover, the primary- and secondary-side power supply systems 31, 32 may employ various power generating and receiving facilities such as a commercial power supply system, a solar photovoltaic system and a motor. The voltage of the primary-side power supply system 31 is referred to as a primary-side system voltage VS1, while the voltage of the secondary-side power supply system 32 is referred to as a secondary-side system voltage VS2. The amplitudes and frequencies of the respective primary- and secondary-side system voltages VS1, VS2 are independent of each other. The power conversion device 1 transmits power between the primary- and secondary-side power supply systems 31, 32 in the bilateral directions or in the unilateral direction.

As shown in FIG. 1, one of the pair of terminals of the primary-side power supply system 31 is referred to as a primary-side reference terminal 33, while the other is referred to as a terminal 35. Similarly, one of the pair of terminals of the secondary-side power supply system 32 is referred to as a secondary-side reference terminal 34, while the other is referred to as a terminal 36. The primary-side reference terminal 33 is that in which a primary-side reference potential appears, while the secondary-side reference terminal 34 is that in which a secondary-side reference potential appears. The primary- and secondary-side reference potentials are, for example, a ground potential. The reference potentials are not necessarily limited to the ground potential. It is desirable, however, that the primary-side reference terminal 33 be a terminal in which the highest value (the absolute value) of the ground potential is less than the highest value (the absolute value) of the ground potential in the other terminal 35. Likewise, it is desirable that the secondary-side reference terminal 34 be a terminal in which the highest value (the absolute value) of the ground potential is less than the highest value (the absolute value) of the ground potential in the other terminal 36.

Furthermore, the primary-side reference terminal 33 is connected to the primary-side terminal 25 of the converter cell 20-1, while the secondary-side reference terminal 34 is connected to the secondary-side terminal 28 of the converter cell 20-N. Specifically, as the stage number $k$ becomes greater, the absolute value of the ground voltage between the primary-side terminals 25, 26 becomes larger while the absolute value of the ground voltage between the secondary-side terminals 27, 28 becomes smaller.

Figure 2:
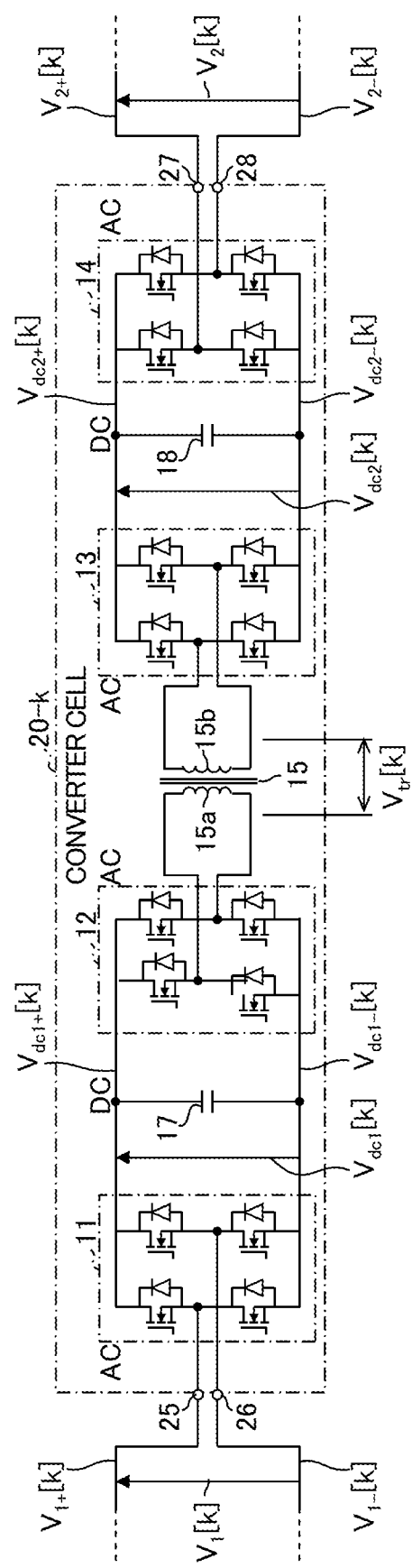
FIG. 2 is a block diagram (circuit diagram) of a converter cell.

FIG. 2 is a block diagram (circuit diagram) of the converter cell 20-$k$.

The AC-DC converters 11 to 14 each include four switching elements connected in an H-bridge shape, and freewheeling diodes (FWDs) connected to the respective switching elements in reverse parallel (although the switching elements or the FWs are denoted by no reference signs). Incidentally, in the embodiment, each switching element is, for example, a MOSFET (standing for metal-oxide-semiconductor field-effect transistor). A voltage which appears between the two ends of the capacitor 17 is referred to as a primary-side DC link voltage $V_{dc1}$ (a primary-side DC voltage). A voltage which is the higher of the voltages appearing at the respective two ends of the capacitor 17 is referred to as a primary-side DC link positive voltage $V_{dc1+}[k]$ ($k$ is a stage number) and a voltage which is the lower of them is referred to as a primary-side DC link negative voltage $V_{dc1-}[k]$.

Meanwhile, a voltage which appears between the primary-side terminals 25, 26 is referred to as a primary-side AC inter-terminal voltage $V_1[k]$. A voltage which is the higher of the voltages (potentials relative to the ground) appearing at the primary-side terminals 25, 26 is referred to as a primary-side AC positive voltage $V_{1+}[k]$, and a voltage which is the lower of them is referred to as a primary-side AC negative voltage $V_{1-}[k]$. The AC-DC converter 11 transmits power while converting the primary-side AC inter-terminal voltage $V_1[k]$ and the primary-side DC link voltage $V_{dc1}$ in the bilateral directions or in the unilateral direction.

The high-frequency transformer 15 includes a primary winding 15$a$ and a secondary winding 15$b$, and transmits power at a predetermined frequency between the primary and secondary windings 15$a$, 15$b$. Currents which the AC-DC converters 12, 13 receive and output from and to the high-frequency transformer 15 each have a high frequency. In this respect, the high frequency means, for example, a frequency of 100 Hz or more. It is desirable that a frequency of 1 kHz or more be employed as the high frequency. It is more desirable that a frequency of 10 kHz or more be employed as the high frequency. The AC-DC converter 12 transmits power while converting the primary-side DC link voltage $V_{dc1}$ and a voltage appearing in the primary winding 15$a$ in the bilateral directions or in the unilateral direction.

Meanwhile, a voltage appearing at the two ends of the capacitor 18 is referred to as a secondary-side DC link voltage $V_{dc2}$ (a secondary-side DC voltage). In addition, a voltage which is the higher of the voltages (potentials relative the ground) appearing at the two ends of the capacitor 18 is referred to as a secondary-side DC link positive voltage $V_{dc2+}[k]$, while a voltage which is the lower of them is referred to as a secondary-side DC link negative voltage $V_{dc2-}[k]$. The AC-DC converter 13 transmits power while converting the secondary-side DC link voltage $V_{dc2}$ and a voltage appearing in the secondary winding 15$b$ in the bilateral directions or in the unilateral direction. Although the potential difference between the primary and secondary windings 15$a$, 15$b$ varies depending on where the potential difference is measured, the maximum potential difference is referred to as a transformer potential difference $V_{tr}[k]$.

Meanwhile, a voltage appearing between the secondary-side terminals 27, 28 is referred to as a secondary-side AC inter-terminal voltage $V_2[k]$. A voltage which is the higher of the voltages (potentials relative to the ground) appearing in the secondary-side terminals 27, 28 is referred to as a secondary-side AC positive voltage $V_{2+}[k]$ while a voltage which is the lower of them is referred to as a secondary-side AC negative voltage $V_{2-}[k]$. The AC-DC converter 14 transmits power while converting the secondary-side AC inter-terminal voltage $V_2[k]$ and the secondary-side DC link voltage $V_{dc2}$ in the bilateral directions or in the unilateral direction.

Let us assume that in FIG. 1, amplitude values of the primary- and secondary-side system voltages VS1, VS2 are at $V_{ac1}$ and $V_{ac2}$ and the primary- and secondary-side DC link voltages $V_{dc1}$, $V_{dc2}$ of each converter cell 20-$k$ are at 1/N of the amplitude value $V_{ac1}$ and 1/N of the amplitude value $V_{ac2}$, respectively. In this case, the primary-side AC inter-terminal voltage $V_1[k]$ shown in FIG. 2 is at $\pm V_{ac1}/N$ or at 0, while the secondary-side AC inter-terminal voltage $V_2[k]$ shown in FIG. 2 is at $\pm V_{ac2}/N$ or at 0.

Figure 3:
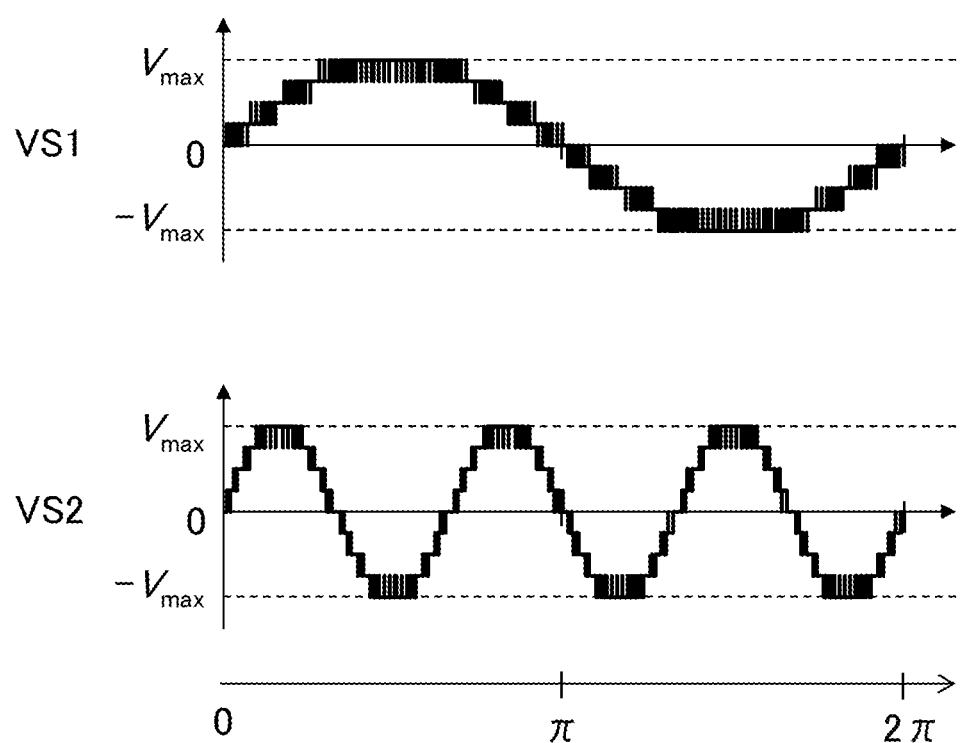
FIG. 3 is a diagram showing examples of waveforms of primary- and secondary-side system voltages.

FIG. 3 is a diagram showing examples of waveforms of the primary- and secondary-side system voltages VS1, VS2. For the purpose of simplifying explanations, let us assume that in the shown example, the primary- and secondary-side system voltages VS1, VS2 have the same amplitude value $V_{max}$ but have mutually-different frequencies.

As shown in FIG. 1, the primary-side terminal 26 of the converter cell 20-1 is connected to the primary-side reference terminal 33 of the primary-side power supply system 31. Thus, when the primary-side system voltage VS1 is divided into equal portions by the converter cells 20-1 to 20-N, the range of voltage variation in the primary-side terminal 26 is between $-V_{max}/N$ and $+V_{max}/N$. Meanwhile, the secondary-side terminal 27 of the converter cell 20-1 is connected to the other terminal 36 of the secondary-side power supply system 32.

Thus, the range of voltage variation in the secondary-side terminal 27 is between $-V_{max}$ and $+V_{max}$. Hence, the transformer potential difference $V_{tr}[k]$ is from $-(1+1/N)V_{max}$ to $+(1+1/N)V_{max}$. For example, in a case where the number N of converter cells is four, the transformer potential differences $V_{tr}[k]$ of the respective converter cells 20-1 to 20-4 are at the same value of $-1.25V_{max}$ or more but $+1.25V_{max}$ or less. Reasons for why this happens will be described in detail later.

<Example of Application to Three-Phase AC System>

Figure 4:
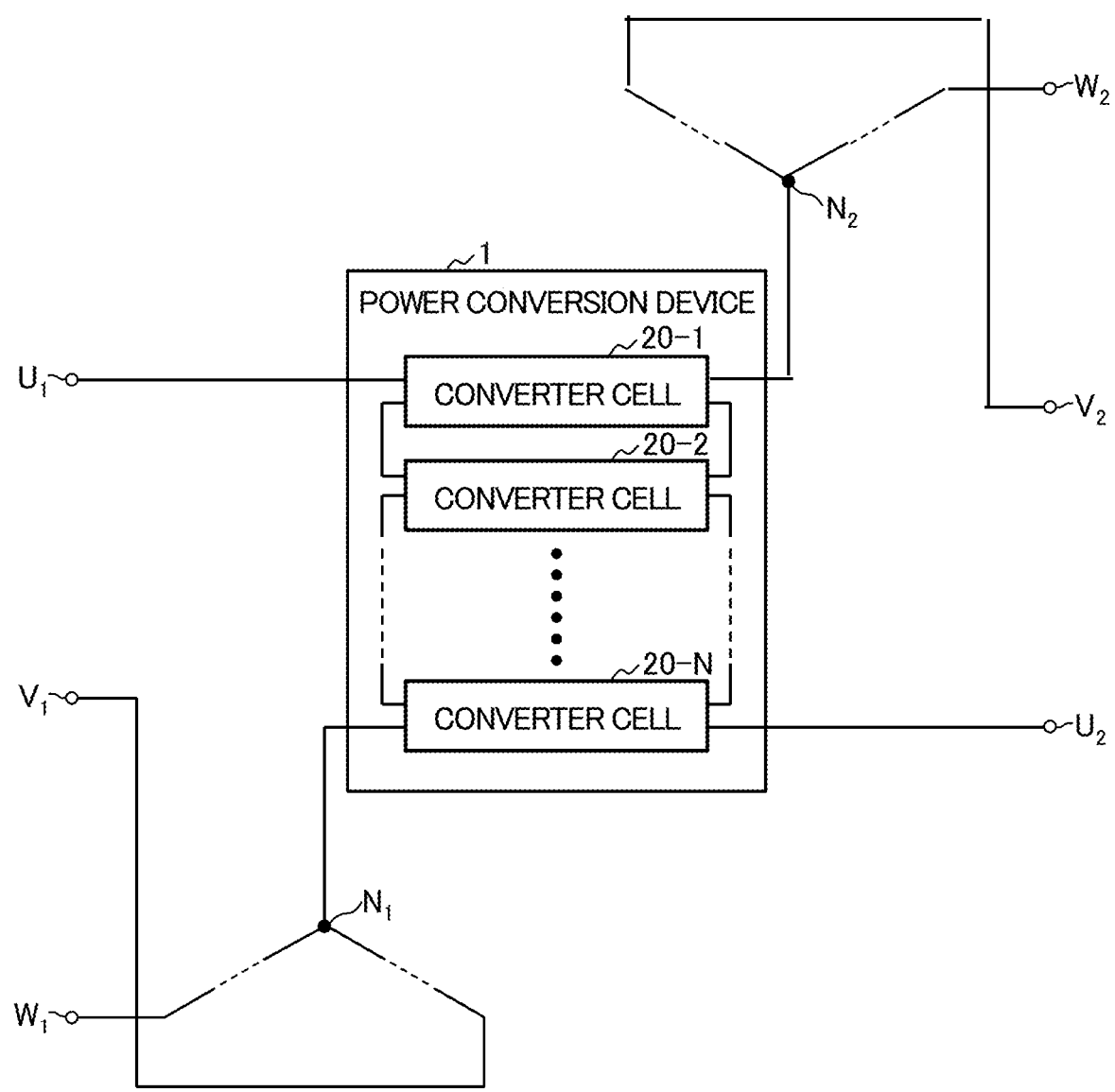
FIG. 4 is a block diagram of a configuration of a three-phase AC system to which the first embodiment is applied.

FIG. 4 is a block diagram of a configuration of a three-phase AC system to which the first embodiment is applied.

In FIG. 4, the U-, V- and W-phase terminals of a primary-side three-phase power supply system are denoted by reference signs $U_1$, $V_1$, $W_1$; the U-, V- and W-phase terminals of a secondary-side three-phase power supply system are denoted by reference signs $U_2$, $V_2$, $W_2$; and the neutral points are denoted by reference signs $N_1$, $N_2$. In the shown three-phase AC system, the neutral points $N_1$, $N_2$ serve as the primary- and secondary-side reference terminals. Between the terminal $U_1$ and the neutral point $N_1$ on the primary side, the primary-side terminals 25, 26 (see FIGS. 1 and 2) of the converter cells 20-1 to 20-N are connected to one another in series. Meanwhile, between the neutral point $N_2$ and the terminal $U_2$ on the secondary side, the secondary-side terminals 27, 28 thereof are connected to one another in series.

The power conversion device 1 is connected to the V and W phases, although their illustration is omitted, like the power conversion device 1 is connected to the U phase.

In the embodiment, if the amplitude values of the primary- and secondary-side phase voltages are both at $V_{max}$, the transformer potential difference $V_{tr}[k]$ of each converter cell 20-$k$ is from $-(1+1/N)V_{max}$ to $+(1+1//N)V_{max}$, as in the case shown in FIG. 1.

COMPARATIVE EXAMPLE

Figure 5:
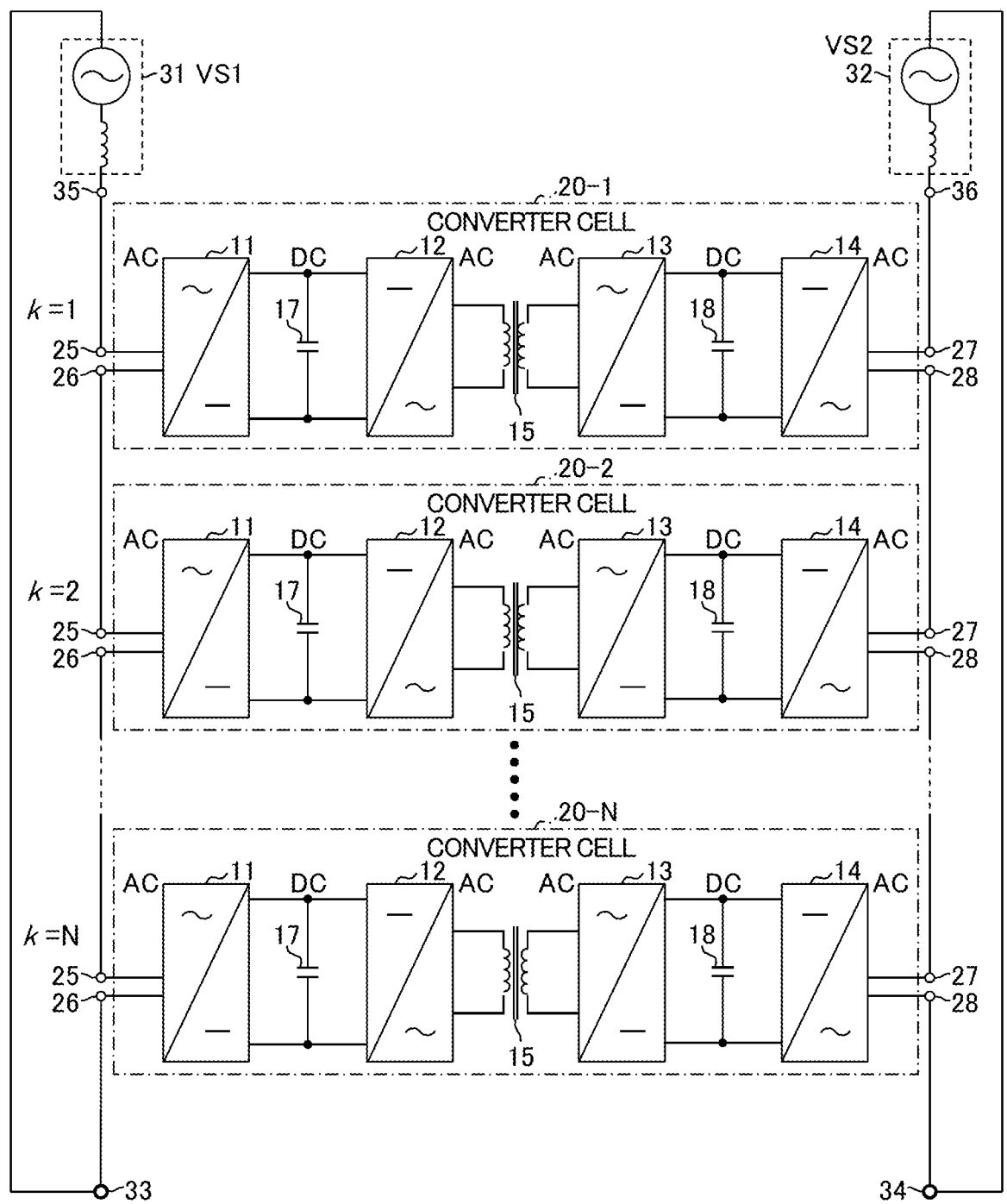
FIG. 5 is a block diagram of a power conversion device according to a comparative example.

FIG. 5 is a block diagram of a power conversion device according to a comparative example.

Like the power conversion device 1 according to the first embodiment, the power conversion device 101 according to the comparative example includes N converter cells 20-1 to 20-N. In addition, each converter cell 20-$k$ has the same internal configuration as that (see FIG. 2) according to the first embodiment. The comparative example, however, is different from the first embodiment in terms of how to connect the primary-side terminals 25, 26. Specifically, in the comparative example, the primary-side reference terminal 33 is connected to the primary-side terminal 26 of the converter cell 20-N, while the higher-voltage terminal 35 of the primary-side power supply system 31 is connected to the primary-side terminal 25 of the converter cell 20-1.

Specifically, in the comparative example, as the stage number k becomes greater, both the voltage appearing between the primary-side terminals 25, 26 and the voltage appearing between the secondary-side terminals 27, 28 become lower. Thus, the range of voltage variation in the primary-side terminal 26 of the converter cell 20-1 is from $-V_{max}$ to $+V_{max}$. Meanwhile, the range of voltage variation in the secondary-side terminal 27 of the converter cell 20-1 is also from $-V_{max}$ to $+V_{max}$. Hence, the transformer potential difference $V_{tr}[1]$ of the converter cell 20-1 is from $-2V_{max}$ to $+2V_{max}$.

In the comparative example, however, the transformer potential difference $V_{tr}[k]$ differs depending on the stage number k. For example, if the number N of converter cells is four, the transformer potential difference $V_{tr}[k]$ is as follows. When k=2, the transformer potential difference $V_{tr}[2]$ in the converter cell 20-2 is from $-1.5V_{max}$ to $+1.5V_{max}$. When k=3, the transformer potential difference $V_{tr}[3]$ in the converter cell 20-3 is from $-V_{max}$ to $+V_{max}$. When k=4, the transformer potential difference $V_{tr}[4]$ in the converter cell 20-4 is from $-0.5V_{max}$ to $+0.5V_{max}$. Reasons for why this happens will be described in detail later.

As discussed above, the comparative example makes the transformer potential difference $V_{tr}[k]$ differ depending on the stage number k. It is unrealistic to apply the high-frequency transformer 15 whose voltage breakdown performance differs depending on the stage number k. In other words, a realistic approach to cost reduction based on the mass production effect is to apply the high-frequency transformer 15 with the same specification to all the converter cells 20-1 to 20-N. This requires the breakdown voltage performance of the high-frequency transformers 15 in the respective converter cells 20-1 to 20-N to deal with the transformer potential difference $V_{tr}[1]$ which is the highest among the above-discussed transformer potential differences, that is to say, the potential difference which is from $-2V_{max}$ to $+2V_{max}$.

Figure 6:
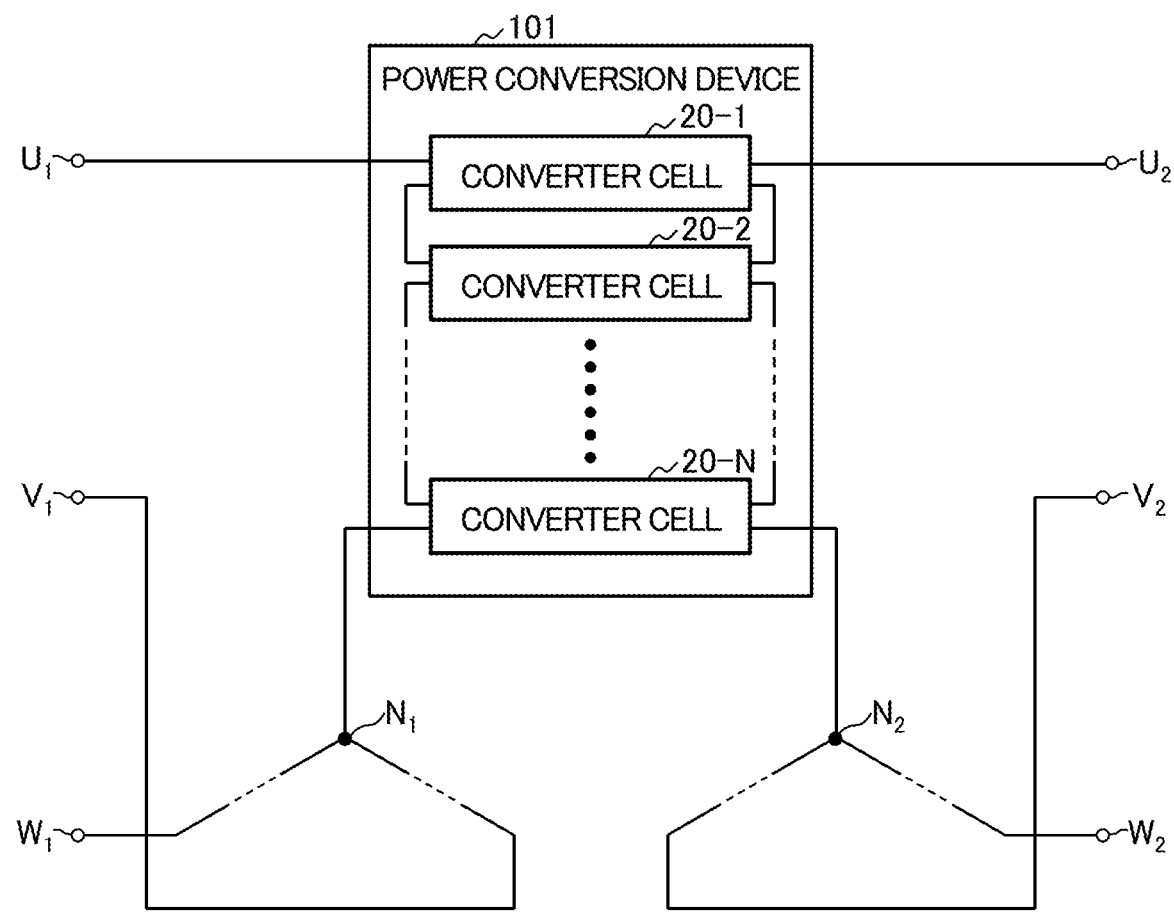
FIG. 6 is a block diagram of a configuration of a three-phase AC system to which the power conversion device according to the comparative example is applied.

FIG. 6 is a block diagram of a configuration of a three-phase AC system to which the power conversion device 101 according to the comparative example is applied.

In FIG. 6, the U-, V- and W-phase terminals of the primary-side three-phase power supply system are denoted by reference signs $U_1$, $V_1$, $W_1$; the U-, V- and W-phase terminals of the secondary-side three-phase power supply system are denoted by reference signs $U_2$, $V_2$, $W_2$; and the neutral points are denoted by reference signs $N_1$, $N_2$, as in the case of the first embodiment (see FIG. 4). In the comparative example, between the terminal $U_1$ and the neutral point $N_1$ on the primary side, the primary-side terminals 25, 26 (see FIG. 5) of the converter cells 20-1 to 20-N are connected to one another in series. Meanwhile, between the terminal $U_2$ and the neutral point $N_2$ on the secondary side, the secondary-side terminals 27, 28 (see FIG. 5) thereof are connected to one another in series.

The power conversion device 1 is connected to the V and W phases, although their illustration is omitted, like the power conversion device 1 is connected to the U phase.

In the embodiment, if the amplitude values of the primary- and secondary-side phase voltages are both at $V_{max}$, the range of the voltage variation in the primary-side terminal 26 of the converter cell 20-1 is from $-V_{max}$ to $+V_{max}$, and the range of the voltage variation in the secondary-side terminal 27 of the converter cell 20-1 is also from $-V_{max}$ to $+V_{max}$, as in the case shown in FIG. 5. Thus, the highest transformer potential difference $V_{tr}[1]$ is from $-2V_{max}$ to $+2V_{max}$.

<Detailed Explanation of Numerical Bases>

As discussed above, if the number N of converter cells is four, the transformer potential differences $V_{tr}[k]$ of the converter cells 20-1 to 20-4 in the comparative example are from $-2V_{max}$ to $+2V_{max}$, from $-1.5V_{max}$ to $+1.5V_{max}$, from $-V_{max}$ to $+V_{max}$, and from $-0.5V_{max}$ to $+0.5V_{max}$, respectively. On the other hand, the transformer potential differences $V_{tr}[k]$ of the converter cells 20-1 to 20-4 in the first embodiment are all from $-1.25V_{max}$ to $+1.25V_{max}$. Reason for why this happens will be hereinbelow described in detail.

(Numerical Bases for Comparative Example)

FIGS. 7A to 7D are diagrams for explaining operating modes of the AC-DC converter 11 (see FIG. 2) included in the converter cell 20-k. Incidentally, the shown operating modes are common between the first embodiment and the comparative example.

In FIGS. 7A to 7D, four switching elements included in the AC-DC converter 11 are denoted by reference signs $Q_1$ to $Q_4$. The AC-DC converter 11 has four operating modes M1 to M4. What two of the four switching elements $Q_1$ to $Q_4$ establish electrical conduction therebetween is determined based on what operating mode the AC-DC converter 11 is in.

Figure 7A:
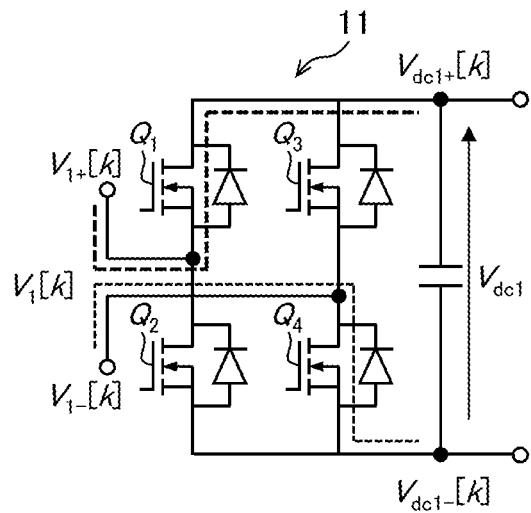
FIGS. 7A, 7B, 7C and 7D are diagrams for explaining operating modes M1, M2, M3, M4 of an AC-DC converter 11.

To begin with, during the operating mode M1 shown in FIG. 7A, electrical conduction is established between the switching elements $Q_1$, $Q_4$, while no electrical conduction is established between the other switching elements $Q_2$, $Q_3$. Hence, the primary-side DC link negative voltage $V_{dc1\_}[k]$ is equal to the primary-side AC negative voltage $V_{1\_}[k]$, while the primary-side AC inter-terminal voltage $V_1[k]$ is equal to the primary-side DC link voltage $V_{dc1}$.

Figure 7B:
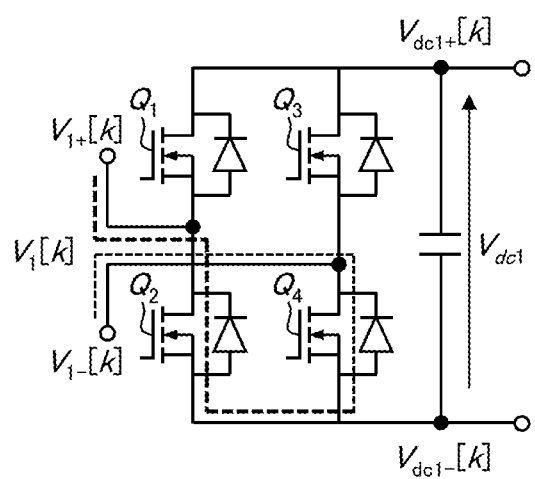

Meanwhile, during the operating mode M2 shown in FIG. 7B, electrical conduction is established between the switching elements $Q_2$, $Q_4$, while no electrical conduction is established between the other switching elements $Q_1$, $Q_3$. Hence, the primary-side DC link negative voltage $V_{dc1\_}[k]$ is equal to the primary-side AC negative voltage $V_{1\_}[k]$, while the primary-side AC inter-terminal voltage $V_1[k]$ is equal to 0.

Figure 7C:
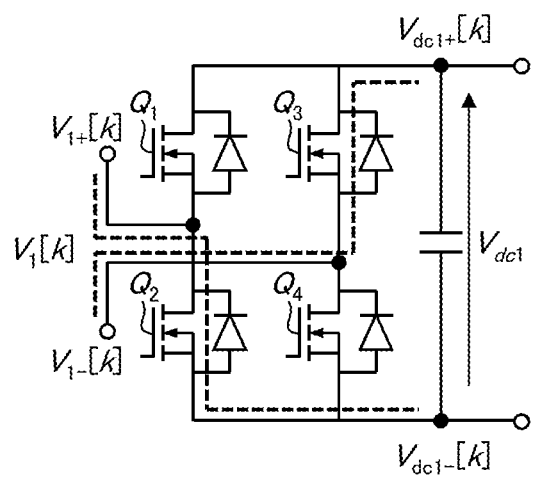

Meanwhile, during the operating mode M3 shown in FIG. 7C, electrical conduction is established between the switching elements $Q_2$, $Q_3$, while no electrical conduction is established between the other switching elements $Q_1$, $Q_4$. Hence, the primary-side DC link negative voltage $V_{dc1\_}[k]$ is equal to $-V_{dc1+}V_{1\_}[k]$, while the primary-side AC inter-terminal voltage $V_1[k]$ is equal to $-V_{dc1}$.

Figure 7D:
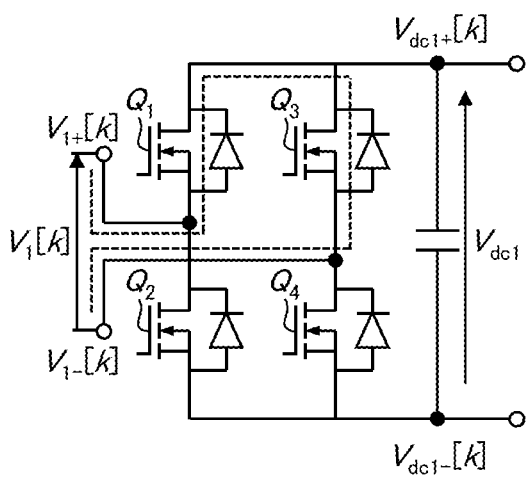

Meanwhile, during the operating mode M4 shown in FIG. 7D, electrical conduction is established between the switching elements $Q_1$, $Q_3$, while no electrical conduction is established between the switching elements $Q_2$, $Q_4$. Hence, the primary-side DC link negative voltage $V_{dc1\_}[k]$ is equal to $-V_{dc1+}V_{1\_}[k]$, while the primary-side AC inter-terminal voltage $V_1[k]$ is equal to 0.

In short, in the comparative example shown in FIG. 5, the voltages in the parts during the operating modes M1 to M4 are expressed with Equations (1) to (3) given bellow.

[Eq. 1]
$$V_{dc1\_}[k] - V_{1\_}[k] = \begin{cases} 0 & \text{mode 1, mode 2} \\ -V_{dc1} & \text{mode 3, mode 4} \end{cases} \quad (1)$$

[Eq. 2]
$$V_1[k] = \begin{cases} V_{dc1} & \text{mode 1} \\ 0 & \text{mode 2, mode 4} \\ -V_{dc1} & \text{mode 3} \end{cases} \quad (2)$$

[Eq. 3]
$$V_{1\_}[k] = V_{1\_}[N] + \sum_{m=k+1}^{N} V_1[m] = \sum_{m=k+1}^{N} V_1[m] \quad (3)$$

In the comparative example shown in FIG. 5, the primary-side terminal 26 of the converter cell 20-N is connected to the primary-side reference terminal 33. Equation (3) is derived on the condition that the potential in the primary-side reference terminal 33 is equal to the ground potential, that is to say, the primary-side AC negative voltage $V_{1\_}[N]$ is equal to 0.

Then, the relationship between Equations (2), (3) establishes Equations (4), (5) given below which represents the primary-side AC inter-terminal voltage $V_1[k]$ of each converter cell 20-k.

[Eq. 4]
$$-(N-k)V_{dc1} \le \sum_{m=k+1}^{N} V_1[m] \le (N-k)V_{dc1} \quad (4)$$

[Eq. 5]
$$-(N-k)V_{dc1} \le V_{1\_}[k] \le (N-k)V_{dc1} \quad (5)$$

From these, Equation (6) given below is established for the primary-side DC link negative voltage $V_{dc1\_}[k]$.

[Eq. 6]
$$-(N-k+1)V_{dc1} \le V_{dc1\_}[k] \le (N-k)V_{dc1} \quad (6)$$

Meanwhile, the primary-side DC link positive voltage $V_{dc1+}[k]$ can be obtained by adding the primary-side DC link voltage $V_{dc1}$ to Equation (6), resulting in Equation (7) given below.

[Eq. 7]
$$-(N-k)V_{dc1} \le V_{dc1+}[k] \le (N-k+1)V_{dc1} \quad (7)$$

The primary-side potential of the high-frequency transformer 15 is determined depending on the switching condition of the AC-DC converter 12. Specifically, either or both of the primary-side DC link negative and positive voltages $V_{dc1\_}[k]$, $V_{dc1+}[k]$, which are the ground potentials of the capacitor 17, are applied to the two ends of the primary winding 15a. Thus, the upper and lower values of a potential at an arbitrary part of the primary winding 15a are determined based on the primary-side DC link negative and positive voltages $V_{dc1-}[k]$, $V_{dc1+}[k]$, as expressed with Equation (8) given below where $V_{tr1arb}[k]$ is the potential.

[Eq. 8]

$$V_{dc1-}[k] \leq V_{tr1arb}[k] \leq V_{dc1+}[k] \quad (8)$$

Based on the ranges of the primary-side DC link negative and positive voltages $V_{dc1-}[k]$, $V_{dc1+}[k]$ obtained by Equations (6), (7) and the potential $V_{tr1arb}[k]$ obtained by Equation (8), the range within which the potential $V_{tr1arb}[k]$ falls is expressed with Equation (9) given below.

[Eq. 9]

$$-(N-k+1)V_{dc1} \leq V_{tr1arb}[k] \leq (N-k+1)V_{dc1} \quad (9)$$

In the comparative example shown in FIG. 5, the secondary-side terminal 28 of the converter cell 20-N is connected to the secondary-side reference terminal 34. In this respect, let us assume that the potential of the secondary-side reference terminal is equal to the ground potential, that is to say, the secondary-side AC negative voltage $V_{2-}[N]$ is equal to 0. Thus, a potential $V_{tr2arb}[k]$ at an arbitrary part of the secondary winding 15b of the high-frequency transformer 15 is expressed with Equation (10) given below, as in the case of Equation (9).

[Eq. 10]

$$-(N-k+1)V_{dc2} \leq V_{tr2arb}[k] \leq (N-k+1)V_{dc2} \quad (10)$$

From Equations (9), (10), the range within which the potential difference between the primary and secondary windings 15a, 15b of the high-frequency transformer 15 is obtained as expressed with Equation (11) given below, where $V_{tr1arb}[k] - V_{tr2arb}[k]$ represents the potential difference therebetween.

[Eq. 11]

$$-(N-k+1)(V_{dc1}+V_{dc2})$$
$$\leq V_{tr1arb}[k] - V_{tr2arb}[k]$$
$$\leq (N-k+1)(V_{dc1}+V_{dc2}) \quad (11)$$

Assuming that the amplitude values of the primary- and secondary-side system voltages VS1, VS2 are equal to $V_{ac1}$, $V_{ac2}$ while the amplitude values of the primary- and secondary-side DC link voltages $V_{dc1}$, $V_{dc2}$ of each converter cell 20-k are equal to 1/N of $V_{ac1}$, 1/n of $V_{ac2}$, Equation (12) given below is established.

[Eq. 12]

$$V_{dc1} = V_{ac1}/N, \quad V_{dc2} = V_{ac2}/N \quad (12)$$

By substituting Equation (12) for Equation (11), Equation (13) given below is obtained.

[Eq. 13]

$$-\frac{1}{N}(N-k+1)(V_{ac1}+V_{ac2})$$
$$\leq V_{tr1arb}[k] - V_{tr2arb}[k]$$
$$\leq \frac{1}{N}(N-k+1)(V_{ac1}+V_{ac2}) \quad (13)$$

The reasons for why Equation (13) is established for the specific example shown in FIG. 3 will be discussed below.

As described above, in FIG. 3, the primary- and secondary-side system voltages VS1, VS2 have the same amplitude value $V_{max}$ and the mutually-different frequencies. In this example, $V_{ac1} = V_{ac2} = V_{max}$. Thus, the primary- and secondary-side DC link voltages $V_{dc1}$, $V_{dc2}$ take on a signal value which is equal to the DC link value $V_{dc}$, as expressed with Equation (14).

[Eq. 14]

$$V_{dc1} = V_{dc2} = V_{max}/N = V_{dc} \quad (14)$$

Referring to FIGS. 8 to 12, descriptions will be hereinbelow provided for specific examples of voltage waveforms in the comparative example (see FIG. 5) which occur when the number N of converter cells is four.

Figure 8:
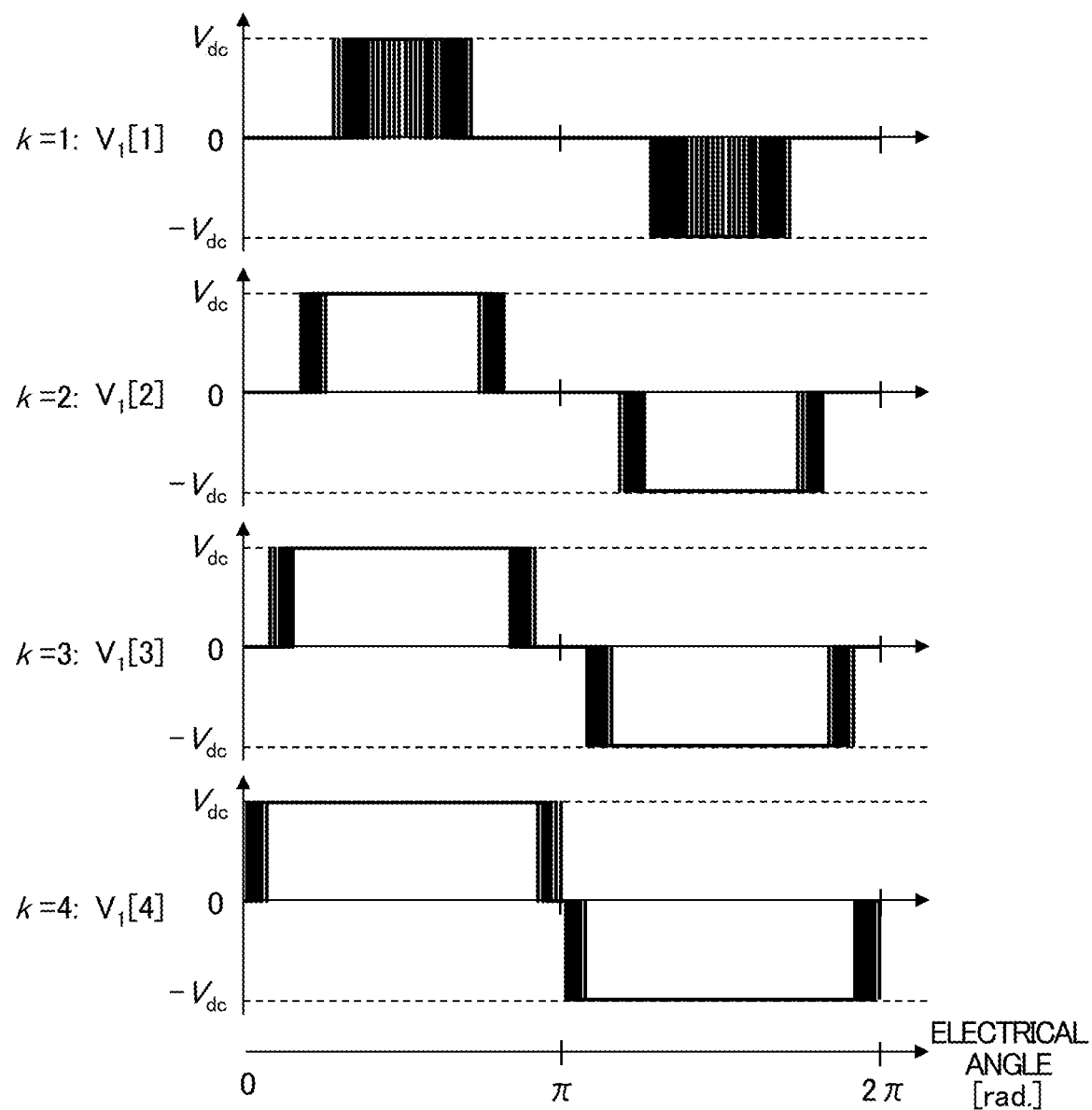
FIG. 8 is a diagram showing waveforms of primary-side AC inter-terminal voltages in the comparative example.
Figure 9:
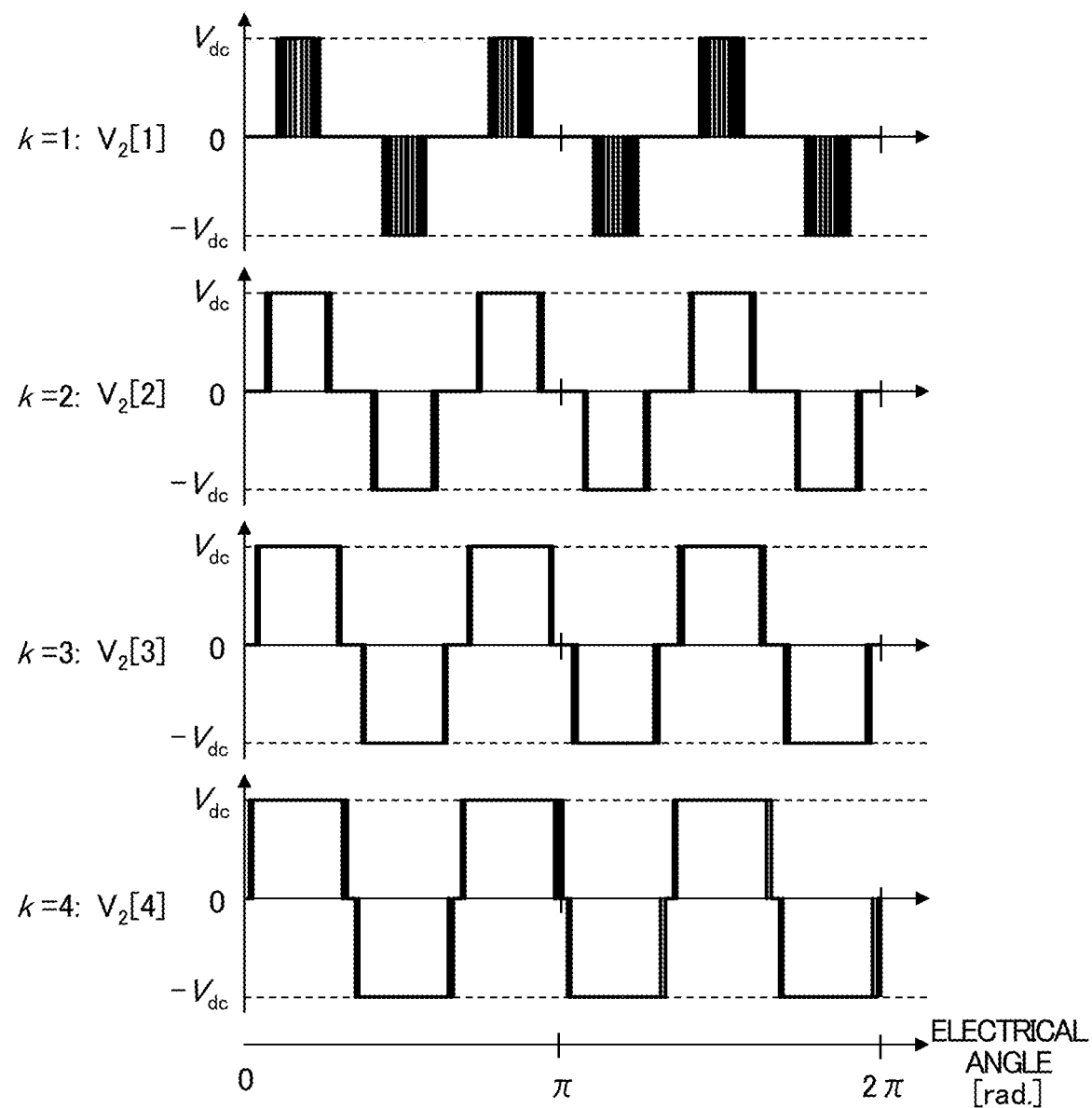
FIG. 9 is a diagram showing waveforms of secondary-side AC inter-terminal voltages in the comparative example.

FIG. 8 is a diagram showing waveforms of the primary-side AC inter-terminal voltages $V_1[k]$, that is to say, $V_1[1]$, $V_1[2]$, $V_1[3]$, $V_1[4]$, in this specific example. Meanwhile, FIG. 9 is a diagram showing waveforms of the secondary-side AC inter-terminal voltages $V_2[k]$, that is to say, $V_2[1]$, $V_2[2]$, $V_2[3]$, $V_2[4]$, in this specific example. In FIGS. 8 and 9, broken lines indicate the DC link voltage $V_{dc}$ of each converter cell 20-k, and its inverted value $-V_{dc}$.

Figure 10:
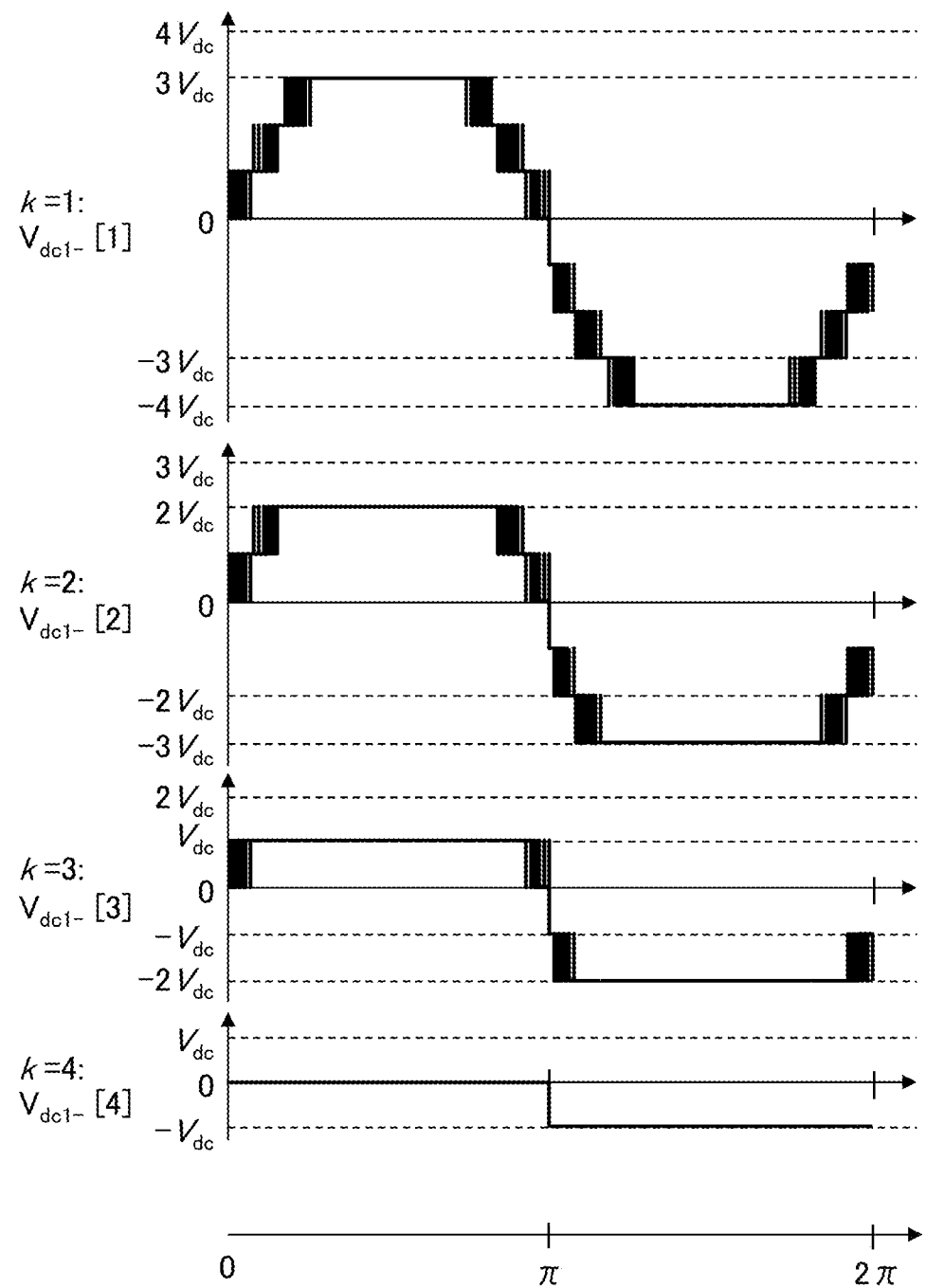
FIG. 10 is a diagram showing waveforms of primary-side DC link negative and positive voltages in the comparative example.

In addition, FIG. 10 is a diagram showing the waveform of the primary-side DC link negative voltage $V_{dc1-}[k]$ of each converter cell 20-k. Meanwhile, FIG. 11 is a diagram showing the waveform of the secondary-side DC link negative voltage $V_{dc2-}[k]$ of each converter cell 20-k.

In this respect, the primary-side DC link positive voltage $V_{dc1+}[k]$ is obtained by adding the primary-side DC link voltage $V_{dc1}$ to the primary-side DC link negative voltage $V_{dc1-}[k]$. Similarly, the secondary-side DC link positive voltage $V_{dc2+}[k]$ is obtained by adding the secondary-side DC link voltage $V_{dc2}$ to the secondary-side DC link negative voltage $V_{dc2-}[k]$. The primary-side DC link positive voltage $V_{dc1+}[k]$ and the secondary-side DC link positive voltage $V_{dc2+}[k]$ are omitted from FIGS. 10 and 11.

Figure 11:
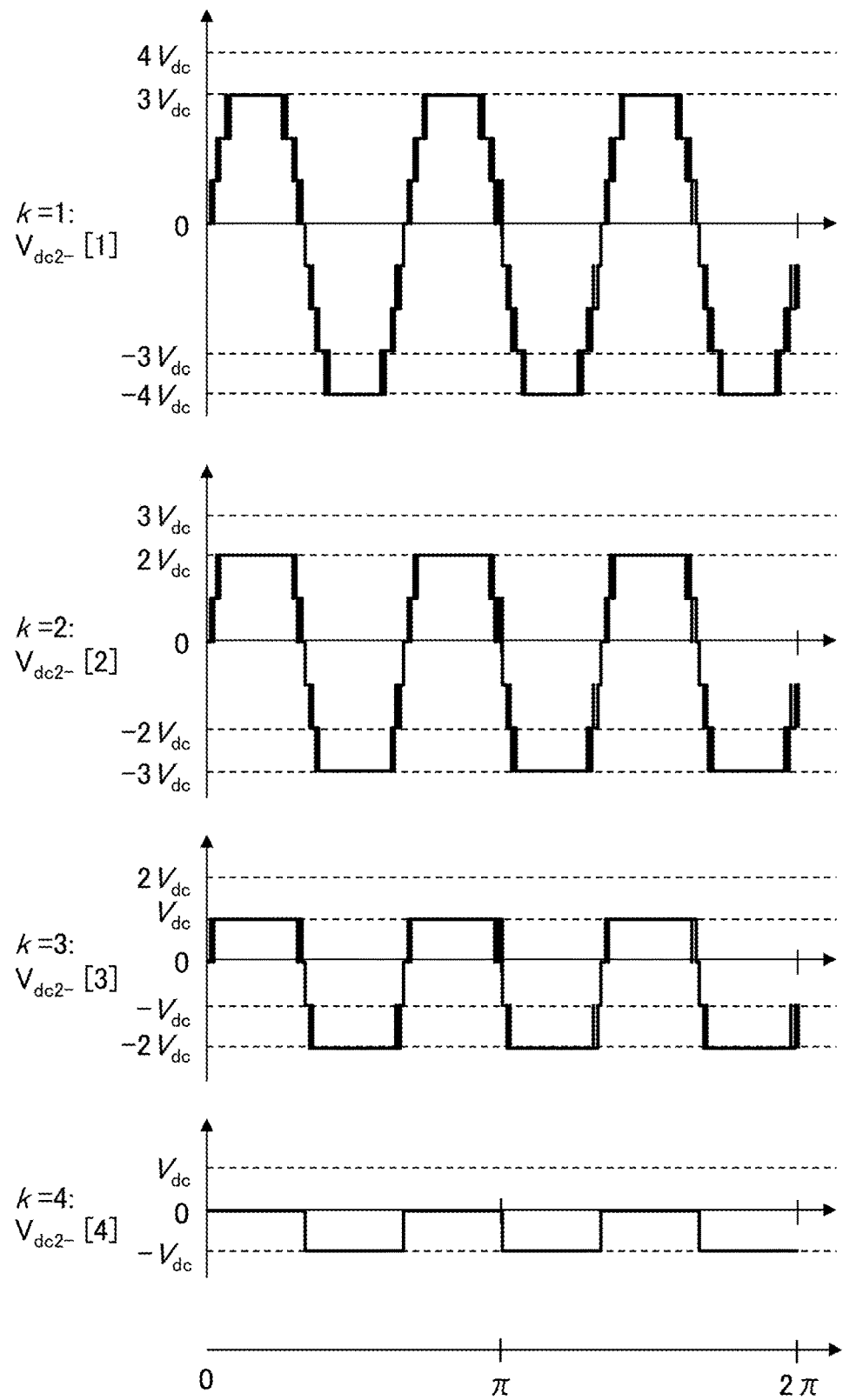
FIG. 11 is a diagram showing waveforms of secondary-side DC link negative and positive voltages in the comparative example.

In FIGS. 10 and 11, broken lines indicate the DC link voltage $V_{dc}$ of each converter cell 20-k, its inverted value $-V_{dc}$, and values obtained by multiplying $V_{dc}$ and $-V_{dc}$ by integers.

Figure 12:
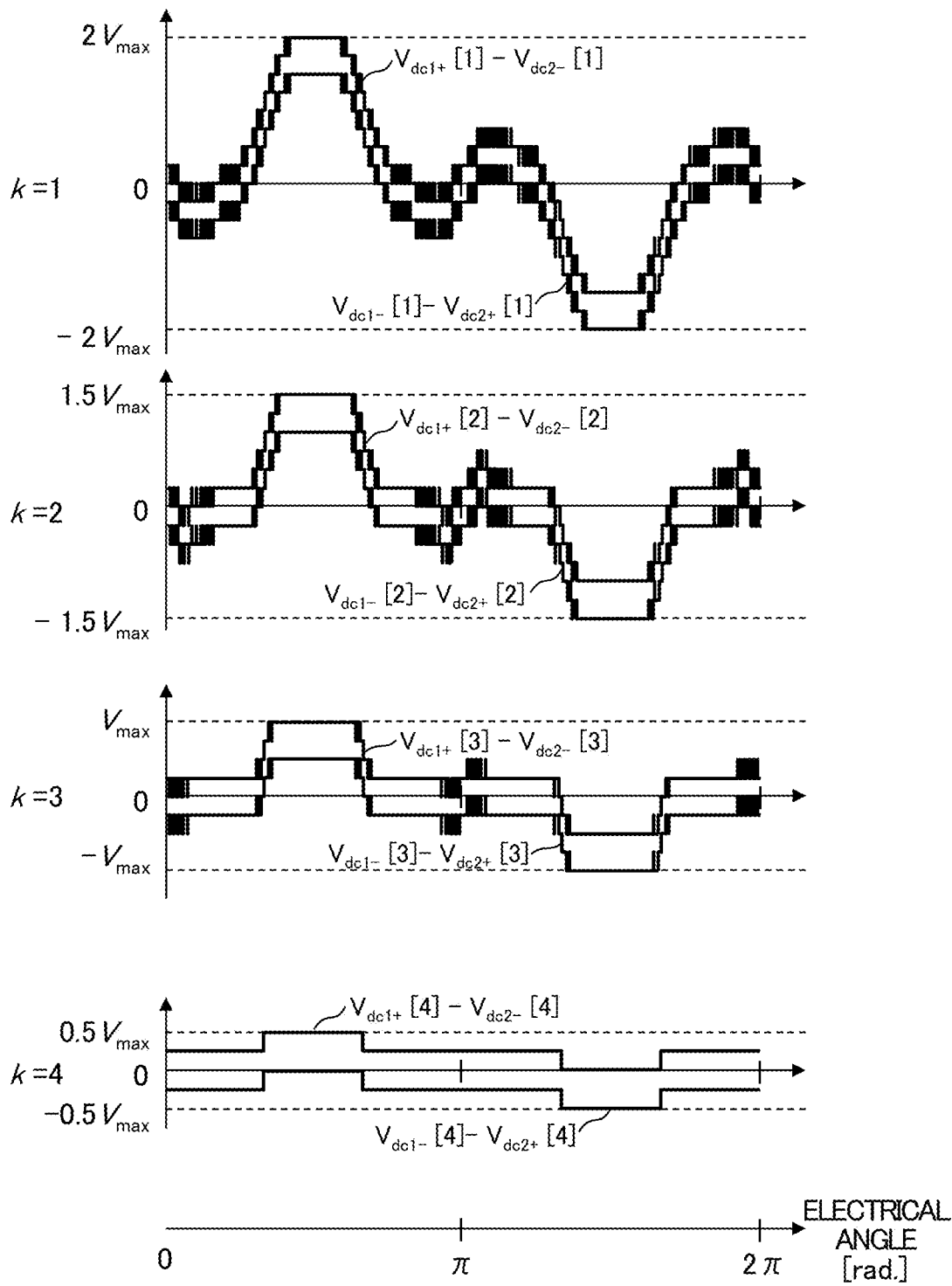
FIG. 12 is a diagram showing potential differences which occur in a high-frequency transformer according to the comparative example.

FIG. 12 is a diagram showing a range within which the potential difference $V_{tr1arb}[k] - V_{tr2arb}[k]$ occurring between the primary and secondary windings 15a, 15b of the high-frequency transformer 15 of each converter cell 20-k can fall in the comparative example.

Specifically, a range between a waveform representing $V_{dc1+}[k] - V_{dc2-}[k]$ and a waveform representing $V_{dc1-}[k] - V_{dc2+}[k]$ in FIG. 12 is the range within which the potential difference $V_{tr1arb}[k] - V_{tr2arb}[k]$ can fall. As for each of the converter cells 20-1, 20-2, 20-3, 20-4 according to the comparative example, it is learned that as shown, the ranges within which potential difference $V_{tr1arb}[k] - V_{tr2arb}[k]$ can fall, that is to say, the transformer potential differences $V_{tr}[k]$, are from $-2V_{max}$ to $+2V_{max}$, from $-1.5V_{max}$ to $+1.5V_{max}$, from $-V_{max}$ to $+V_{max}$ and from $-0.5V_{max}$ to $+0.5V_{max}$, respectively.

Numerical Bases for First Embodiment

Next, as for the first embodiment (see FIG. 1), detailed descriptions will be provided for why the transformer potential difference $V_{tr}[k]$ of every converter cell 20-k falls within the range of $-1.25V_{max}$ to $+1.25V_{max}$ when the number N of converter cells is four.

As in the case of the above-discussed comparative example, Equations (1), (2) are established in the first embodiment, too, when the potentials of the primary- and secondary-side reference terminals 33, 34 are the ground potential.

Incidentally, in the first embodiment, the primary-side terminal 25 of the converter cell 20-1 is connected to the primary-side reference terminal 33, as shown in FIG. 1.

Thus, in addition to Equations (3) to (5) given above, Equations (15) to (17) are established for the primary-side AC inter-terminal voltage $V_1[k]$ of each converter cell 20-$k$.

[Eq. 15]

$$V_{1-}[k] = V_{1+}[1] - \sum_{m=1}^{k} V_1[m] = -\sum_{m=1}^{k} V_1[m] \quad (15)$$

[Eq. 16]

$$-kV_{dc1} \leq \sum_{m=1}^{k} V_1[m] \leq kV_{dc1} \quad (16)$$

[Eq. 17]

$$-kV_{dc1} \leq V_{1-}[k] \leq kV_{dc1} \quad (17)$$

From these, Equation (18) given below is established for the primary-side DC link negative voltage $V_{dc1\_}[k]$.

[Eq. 18]

$$-kV_{dc1} \leq V_{dc1\_}[k] \leq (k-1)V_{dc1} \quad (18)$$

Meanwhile, the primary-side DC link positive voltage $V_{dc1+}[k]$ may be obtained by adding the primary-side DC link voltage $V_{dc1}$ to Equation (18), and the result is expressed with Equation (19) given below.

[Eq. 19]

$$-(k-1)V_{dc1} \leq V_{dc1+}[k] \leq kV_{dc1} \quad (19)$$

From this, the range within which the potential at the arbitrary part of the primary winding 15$a$ can fall is expressed with Equation (20) given below, where $V_{tr1arb}[k]$ is the potential thereat.

[Eq. 20]

$$-kV_{dc1} \leq V_{tr1arb}[k] \leq kV_{dc1} \quad (20)$$

The way in which the converter cells 20-1 to 20-N are connected to the secondary-side power supply system 32 in the first embodiment (see FIG. 1) is the same as the way in which the converter cells 20-1 to 20-N are connected to the secondary-side power supply system 32 in the comparative example (see FIG. 5). For this reason, Equation (10) given above is established, as it is, for the potential $V_{tr2arb}[k]$ at the arbitrary part of the secondary winding 15$b$ of the high-frequency transformer 15.

Based on Equations (10), (20), the range within which the potential difference $V_{tr1arb}[k] - V_{tr1arb}[k]$ between the primary and secondary windings 15$a$, 15$b$ of the high-frequency transformer 15 can fall is obtained as expressed with Equation (21) given below.

[Eq. 21]

$$-kV_{dc1} - (N-k+1)V_{dc2}$$

$$\leq V_{tr1arb}[k] - V_{tr2arb}[k]$$

$$\leq kV_{dc1} + (N-k+1)V_{dc2} \quad (21)$$

Moreover, when Equation (14) is established, Equation (21) is further modified, and Equation (22) given below is established. The stage number k is omitted from Equation (22) representing the range within which the potential difference $V_{tr1arb}[k] - V_{tr2arb}[k]$ can fall. In other words, the range within which the potential difference can fall is constant regardless of the stage number k.

[Eq. 22]

$$-\frac{1}{N}(N+1)V_{max} \leq V_{tr1arb}[k] - V_{tr2arb}[k] \leq \frac{1}{N}(N+1)V_{max} \quad (22)$$

Figure 13:
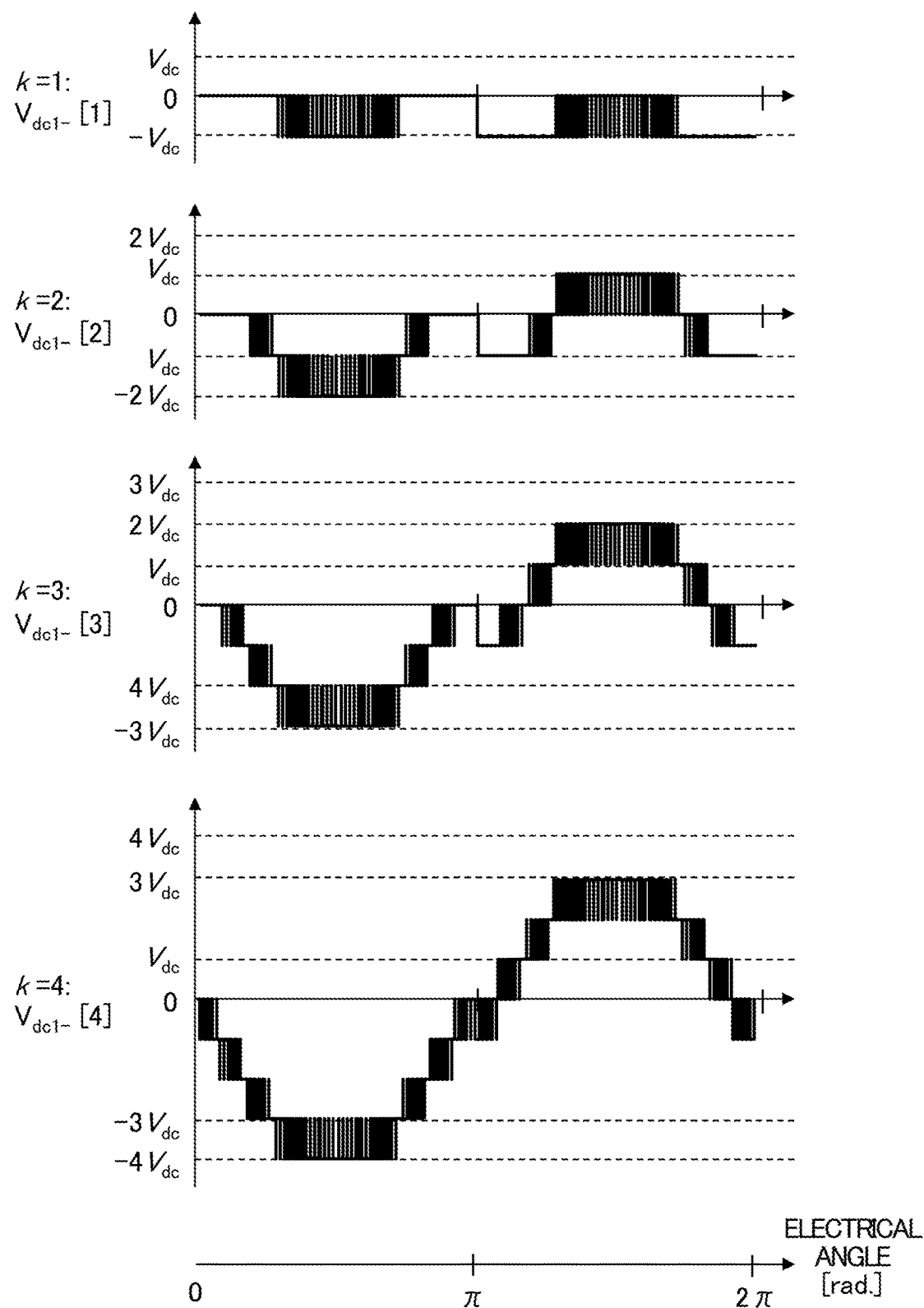
FIG. 13 is a diagram showing waveforms of primary-side DC link negative and positive voltages in the first embodiment.
Figure 14:
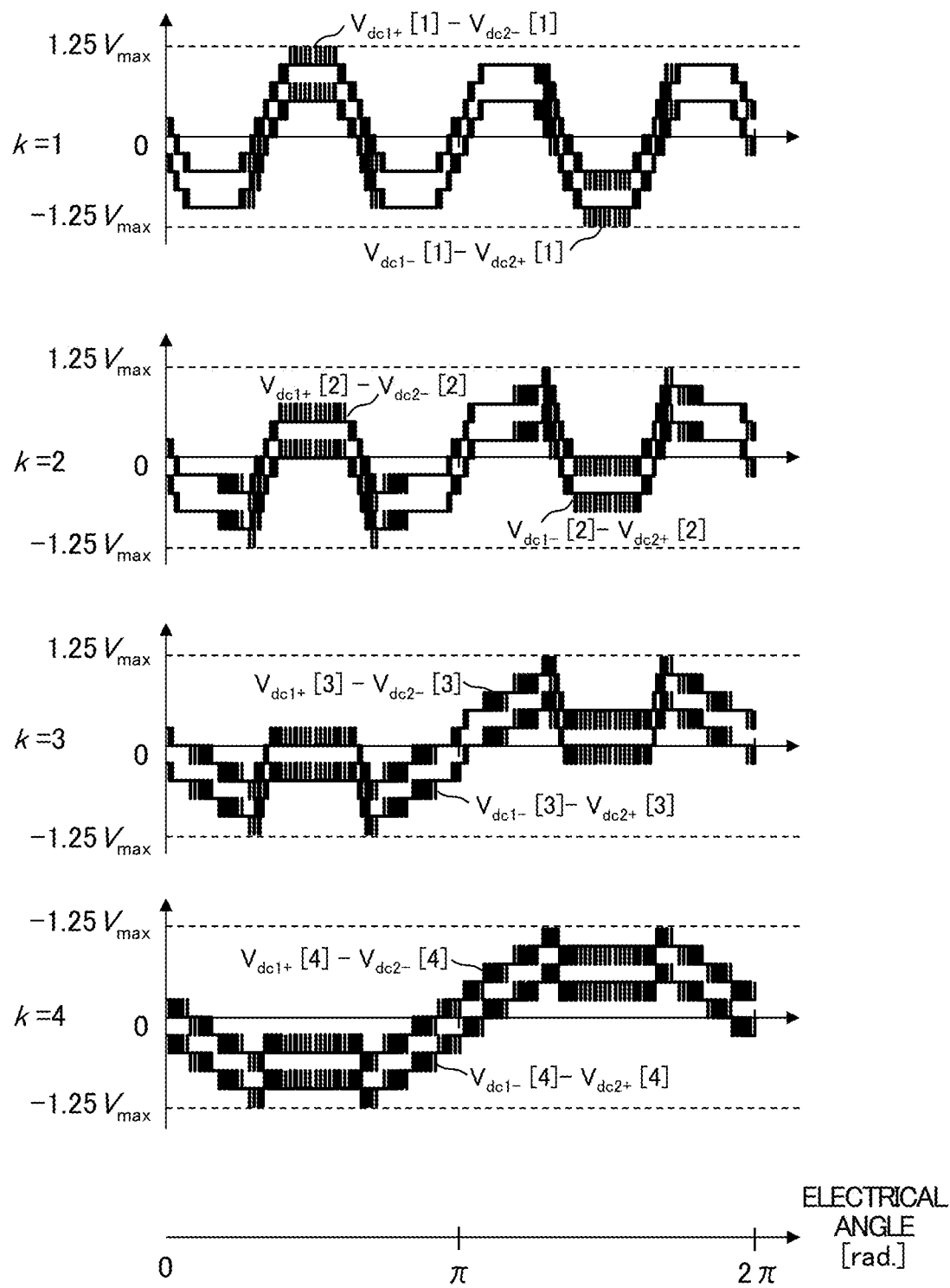
FIG. 14 is a diagram showing potential differences which occur in a high-frequency transformer according to the first embodiment.

Next, using FIGS. 13, 14, descriptions will be provided for specific examples of voltage waveforms which appear when the number N of converter cells is four. FIG. 13 shows the waveform of each primary-side DC link negative voltage $V_{dc1\_}[k]$ in this specific example. Incidentally, the waveform of each secondary-side DC link negative voltage $V_{dc2\_}[k]$ is the same as that in the comparative example (see FIG. 11).

FIG. 14 is a diagram showing the range within which the potential difference $V_{tr1arb}[k] - V_{tr2arb}[k]$ occurring between the primary and secondary windings 15$a$, 15$b$ of the high-frequency transformer 15 in each converter cell 20-$k$ according to the first embodiment can fall.

Specifically, a range between a waveform representing $V_{dc1+}[k] - V_{dc2\_}[k]$ and a waveform representing $V_{dc1\_}[k] - V_{dc2+}[k]$ in FIG. 14 is the range within which the potential difference $V_{tr1arb}[k] - V_{tr2arb}[k]$ can fall. As for all the converter cells 20-1 to 20-4 in the first embodiment, it is learned that as shown, the range within which the potential difference $V_{tr1arb}[k] - V_{tr2arb}[k]$ can fall, that is to say, the transformer potential difference $V_{tr}[k]$, is from $-1.25V_{max}$ to $+1.25V_{max}$.

Effects of First Embodiment

As discussed above, the configuration of the comparative example (see FIGS. 5 and 6) makes the breakdown voltage performance of the high-frequency transformer 15 in each converter cell 20-$k$ have to deal with the transformer potential difference $V_{tr}[1]$ of $-2V_{max}$ to $+2V_{max}$. This causes a problem of increases in the sizes and costs of the high-frequency transformer 15 and the power conversion device 101.

In contrast to this, the configuration of the first embodiment (see FIGS. 1 to 4) is as follows. A converter cell (20-(N+1-j)) (1≤j≤N) in which the absolute value of the ground voltage appearing between the pair of primary-side terminals (25, 26) is the j-th highest among the multiple converter cells (20-1 to 20-N) is configured such that the absolute value of the ground voltage appearing between the pair of secondary-side terminals (27, 28) is the (N+1-j)-th highest among the multiple converter cells (20-1 to 20-N). This configuration enables the transformer potential difference $V_{tr}[k]$ of every converter cell 20-$k$ to be confined within the range of $-(1+1/N)V_{max}$ to $+(1+1/N)V_{max}$. This makes it possible to use the high-frequency transformer 15 with a lower breakdown voltage performance, and to construct the power conversion device 1 in a smaller size and at a lower cost.

Second Embodiment

Configuration of Second Embodiment

Next, descriptions will be provided for a configuration of a power conversion device according to a second embodiment of the present invention.

Figure 15:
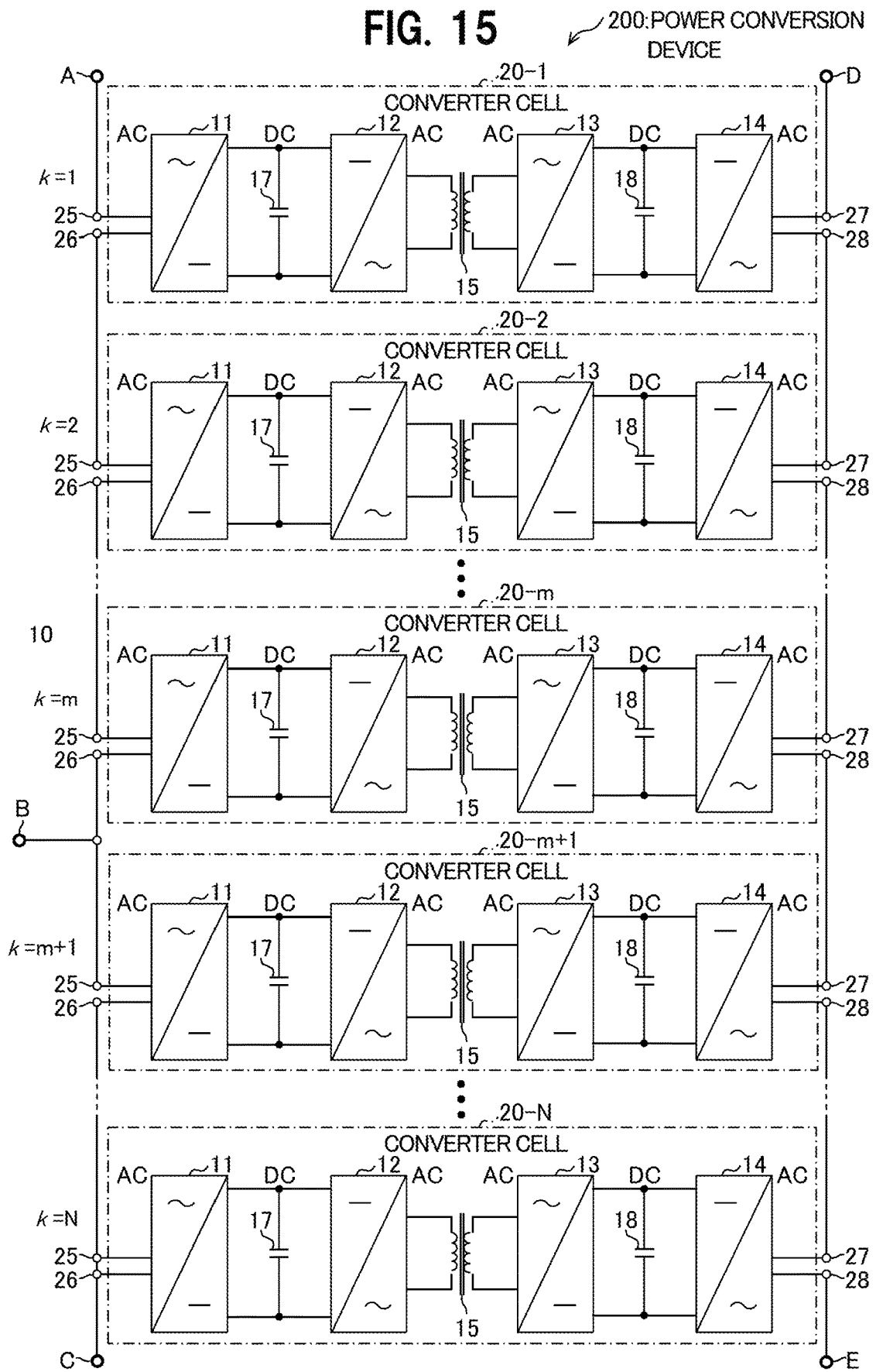
FIG. 15 is a block diagram of a power conversion device according to a second embodiment of the present invention.

FIG. 15 is a block diagram of the power conversion device 200 according to the second embodiment of the present invention.

The power conversion device 200 includes N converter cells 20-1 to 20-N (N is an integer of 2 or more). Each converter cell 20-$k$ (1≤k≤N) has the same configuration as that according to the first embodiment (see FIG. 2).

The primary-side terminals 25, 26 of the converter cells 20-1 to 20-N are connected to one another in series. The two ends of the series circuit are terminals A, C. A connection point at which the primary-side terminal 26 of the converter cell 20-$m$ (1≤m≤N) and the primary-side terminal 25 of the converter cell 20-($m$+1) are connected to each other is a terminal B. Furthermore, the secondary-side terminals 27, 28 of the converter cells 20-1 to 20-N are connected to one another in series. The two ends of the series circuit are terminals D, E.

The ground potential of the primary-side AC inter-terminal voltage $V_1[k]$ (see FIG. 2) of each converter cell 20-$k$ is different in electrical angle phase from the ground potentials of the primary-side AC inter-terminal voltages of the other converter cells. Furthermore, the ground potential of the secondary-side AC inter-terminal voltage $V_2[k]$ of each converter cell 20-$k$ is different in electrical angle phase from the ground potentials of the secondary-side AC inter-terminal voltages of the other converter cells, too. One feature of the second embodiment is that the electrical angle phase of the ground potential differs from one part to another, as discussed above. In addition, the power conversion device 200 according to the second embodiment transmits power between the primary and secondary sides in the bilateral directions or in the unilateral direction. One may consider that like this, the power conversion device 200 according to the second embodiment has a configuration which is based on the application of the power conversion device 1 according to the first embodiment, and which is more generalized than the power conversion device 1.

<Example of Application to Three-Phase AC System>

Figure 16:
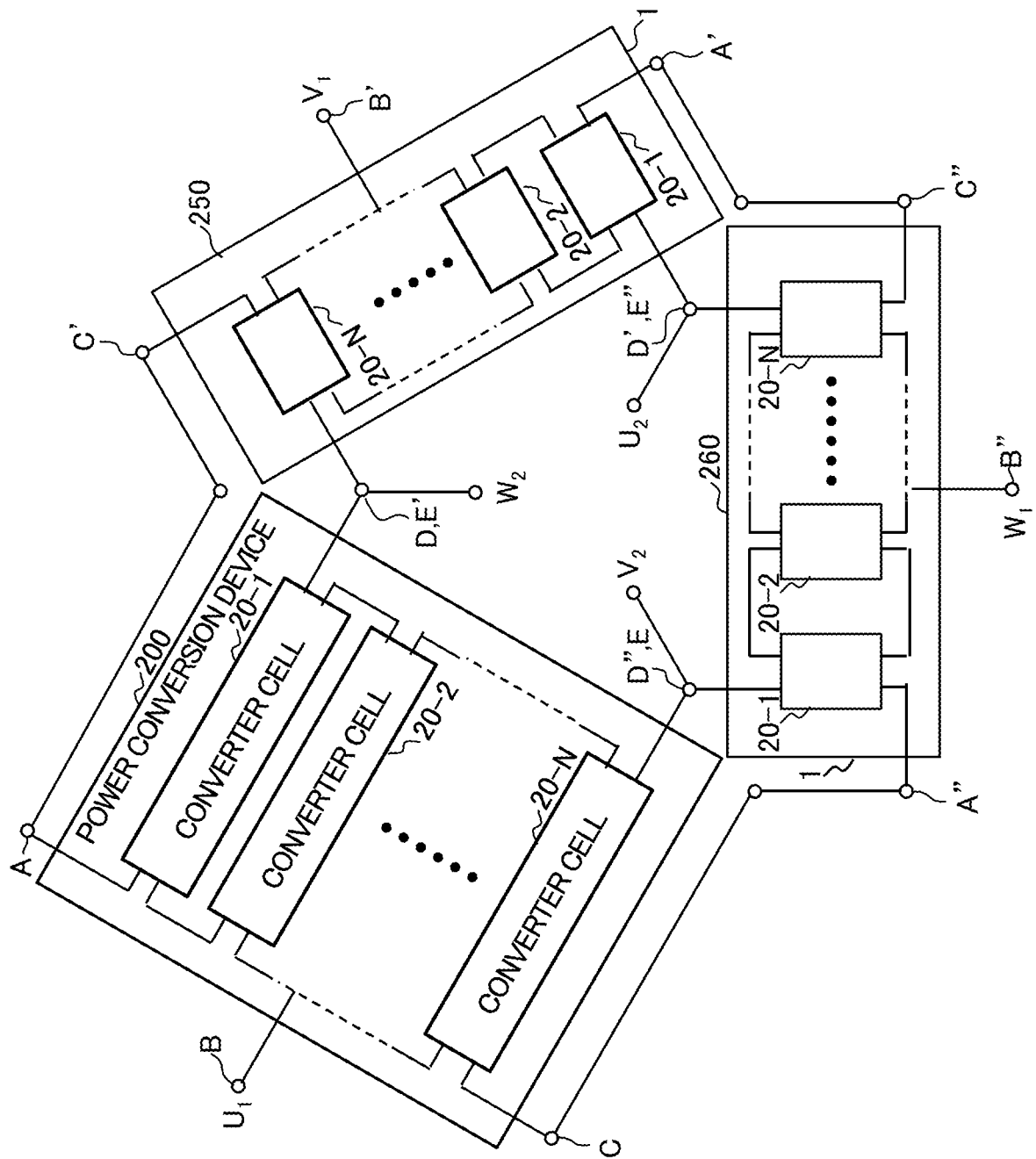
FIG. 16 is a block diagram of a configuration of a three-phase AC system to which the second embodiment is applied.

FIG. 16 is a block diagram of a configuration of a three-phase AC system to which the second embodiment is applied.

In FIG. 16, the U-, V- and W-phase terminals of a primary-side three-phase power supply system are denoted by reference signs $U_1$, $V_1$, $W_1$, while the U-, V- and W-phase terminals of a secondary-side three-phase power supply system are denoted by reference signs $U_2$, $V_2$, $W_2$.

The configuration of the power conversion device 200 is as shown in FIG. 15. Other power conversion devices 250, 260 have the same configuration as the power conversion device 200.

The terminals A, B, C, D, E of the power conversion device 200 shown in FIG. 15 are shown in FIG. 16 as well. Furthermore, the terminals of the power conversion device 250 corresponding to the power conversion device 200 are denoted by reference signs A', B', C', D', E', while the terminals of the power conversion device 260 corresponding to the power conversion device 200 are denoted by reference signs A", B", C", D", E". As shown, the terminals A, C' are connected to each other; the terminals A", C are connected to each other; the terminals A', C" are connected to each other; the terminals $U_1$, B are connected to each other; the terminals $V_1$, B' are connected to each other; and the terminals $W_1$, B" are connected to each other.

Furthermore, the terminals $U_2$, D', E" are connected to one another; the terminals $V_2$, D", E are connected to one another; and the terminals $W_2$, D, E' are connected to one another. In other words, the power conversion devices 200, 250, 260 are connected to the terminals $U_1$, $V_1$, $W_1$ and the terminals $U_2$, $V_2$, $W_2$ by A connection.

As described above, the converter cell 20-$k$ is applicable to the Δ connection system including no neutral point.

Third Embodiment

Next, descriptions will be provided for a configuration of a power conversion device according to a third embodiment of the present invention.

Figure 17:
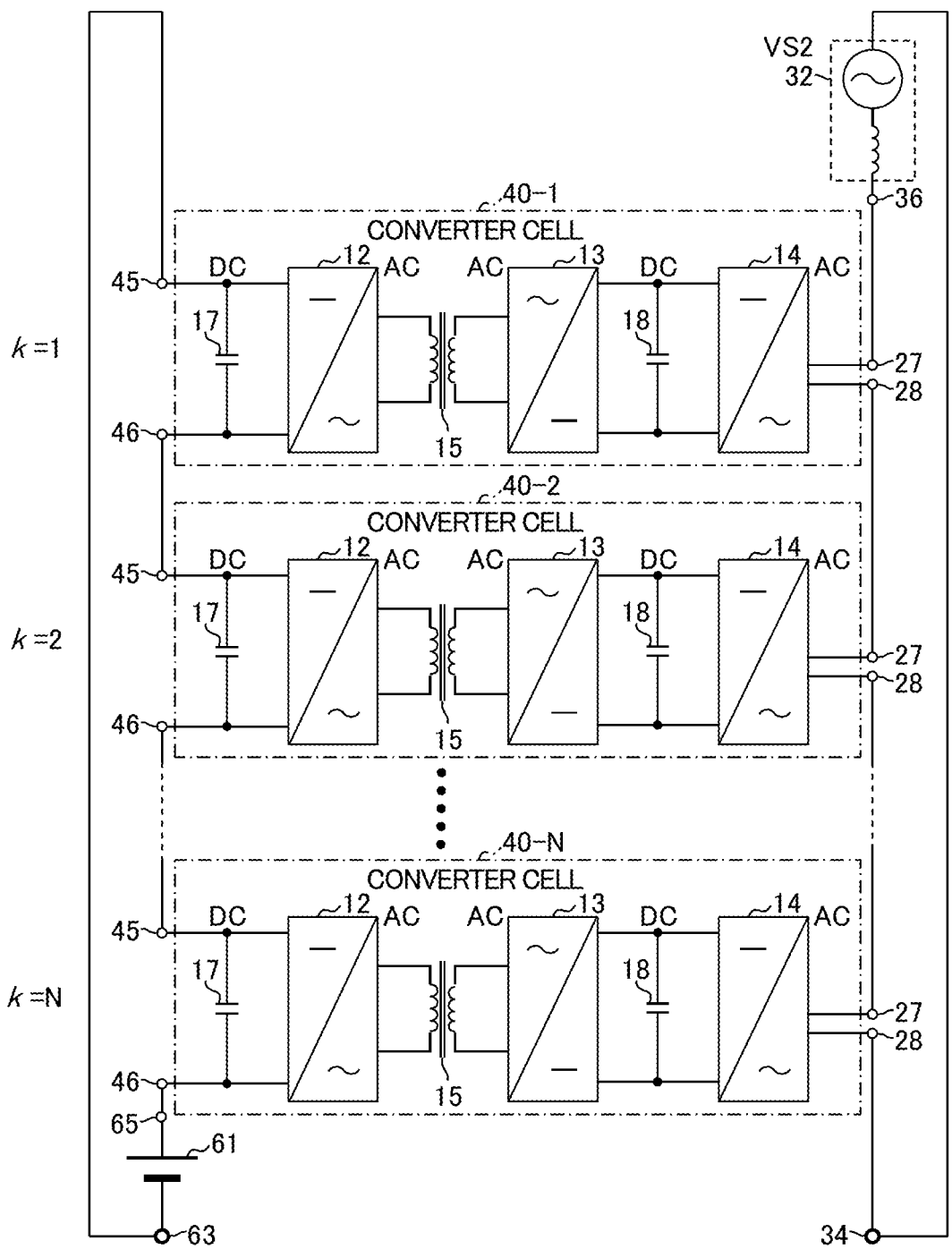
FIG. 17 is a block diagram of a power conversion device according to a third embodiment of the present invention.

FIG. 17 is a block diagram of the power conversion device 300 according to the third embodiment of the present invention.

The power conversion device 300 includes N converter cells 40-1 to 40-N (N is an integer of 2 or more). Each converter cell 40-$k$ (1≤k≤N) includes the AC-DC converters 12 to 14, the capacitors 17, 18, primary-side terminals 45, 46, and the secondary-side terminals 27, 28.

The converter cell 40-$k$ according to the third embodiment is not provided with what corresponds to the AC-DC converter 11 (see FIG. 2) according to the first embodiment, and the two ends of the capacitor 17 are connected to the primary-side terminals 45, 46. The rest of the configuration of the converter cell 40-$k$ is the same as the rest of the configuration of the converter cell 20-$k$ according to the first embodiment (see FIG. 2). Specifically, each converter cell 40-$k$ converts and transmits power between the direct current between the primary-side terminals 45, 46 and the alternating current between the secondary-side terminals 27, 28 in the bilateral directions or in the unilateral direction.

The primary-side terminals 45, 46 of the converter cells 40-1 to 40-N are connected to one another in series, and a primary-side DC power supply system 61 (a primary-side power supply system) is connected to the series circuit. Furthermore, the secondary-side terminals 27, 28 of the converter cells 20-1 to 20-N are connected to one another in series, and the secondary-side power supply system 32 is connected to the series circuit. For example, a DC power generation facility such as a storage battery, or various DC loads may be employed as the primary-side DC power supply system 61.

A terminal whose potential is the closer to the ground potential between the positive and negative terminals of the primary-side DC power supply system 61 is referred to as a primary-side reference terminal 63, and the other terminal is referred to as a terminal 65. In the shown example, the negative terminal of the primary-side DC power supply system 61 is the primary-side reference terminal 63. Furthermore, as in the case of the first embodiment (see FIG. 1), a terminal whose potential is the closer to the ground potential between the pair of terminals of the secondary-side power supply system 32 is referred to as a secondary-side reference terminal 34, and the other terminal is referred to as a terminal 36.

Moreover, the primary-side reference terminal 63 is connected to the primary-side terminal 45 of the converter cell 40-1, while the secondary-side reference terminal 34 is connected to the secondary-side terminal 28 of the converter cell 40-N. Specifically, as the stage number k becomes greater, the absolute value of the ground voltage between the primary-side terminals 45, 46 becomes lager while the absolute value of the ground voltage between the secondary-side terminals 27, 28 becomes smaller.

Accordingly, like the first embodiment, the third embodiment can make the differences between the transformer potential differences $V_{tr}$ (see FIG. 2) of the converter cells 40-1 to 40-N smaller. Thus, the third embodiment also makes it possible to use the high-frequency transformer 15 with a lower breakdown voltage performance, and to construct the power conversion device 300 in a smaller size and at a lower cost.

[Modifications]

The present invention is not limited to the above-discussed embodiments, and can be variously modified. The foregoing embodiments have been exemplified for the purpose of explaining the present invention in an easy-to-understand way, and are not necessarily limited to what include all the discussed components. In addition, an embodiment may be created based on one of the embodiments by replacing some of its components with some of the components of another embodiment, or by adding some of the components of another embodiment. Otherwise, an embodiment may be created based on one of the foregoing embodiments by removing some of its components, or by replacing some of its components with some of the components of another embodiment and adding some of the components of another embodiment. Furthermore, the control lines and information lines shown in the drawings are just what are considered to be necessary for the explanation, and are not necessarily all what are needed for the products. It may be considered that almost all the components are actually connected to one another. Examples of feasible modifications to the foregoing embodiments are as follows.

(1) The foregoing descriptions have been provided for the embodiments in which an MOSFET is employed as the switching elements $Q_1$ to $Q_4$. Instead, however, an insulated gate bipolar transistor (IGBT), a bipolar transistor, a thyristor, a gate turn-off thyristor (GTO), an injection enhanced gate transistor (IEGT), or a vacuum tube-type element such as a thyratron, may be employed as the switching elements. In addition, when a semiconductor is used, an arbitrary material such as Si, SiC and GaN may be used for the semiconductor.

Figure 18:
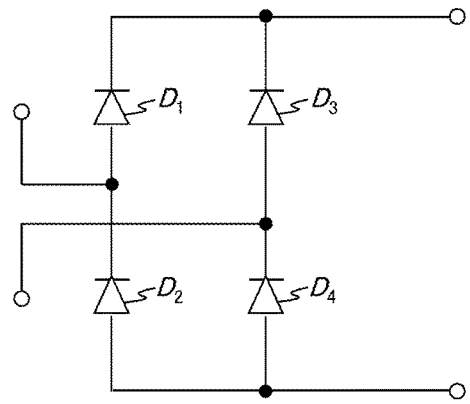
FIG. 18 is a circuit diagram of an H-bridge which is applied to the comparative example.

(2) In addition, the AC-DC converters 11-14 according to each above-discussed embodiment employ the H bridge which uses the switching elements in order to be capable of converting power in the bilateral directions. However, in a case where power may be converted only in the unilateral direction, an H bridge using rectifier elements may be employed in some of the AC-DC converters 11 to 14. FIG. 18 shows an example of a circuit diagram of the H bridge using the rectifier elements $D_1$ to $D_4$. The transformer potential difference $V_{tr}$ of the high-frequency transformer 15 (see FIG. 2) in this modification is the same as the transformer potential difference $V_{tr}$ of the high-frequency transformer 15 in each above-discussed embodiment. This makes it possible to construct the power conversion device in a smaller size and at a lower cost. The rectifier elements $D_1$ to $D_4$ may be a semiconductor diode, a vacuum tube-type mercury rectifier, or the like. In addition, when a semiconductor is used, an arbitrary material such as Si, SiC and GaN may be used for the semiconductor.

Figure 19A:
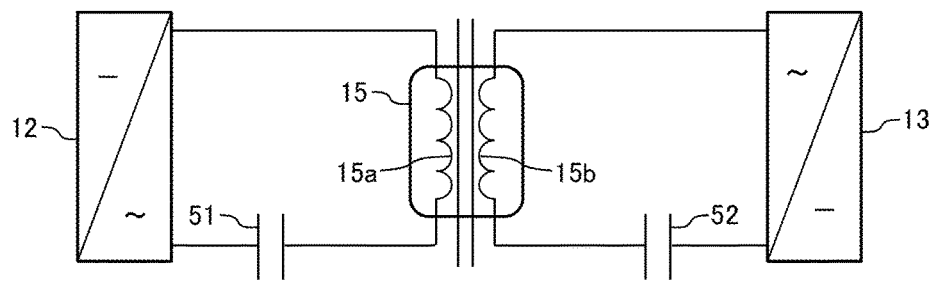
FIGS. 19A to 19C are diagrams of circuits around the high-frequency transformer as applied to other examples.
Figure 19B:
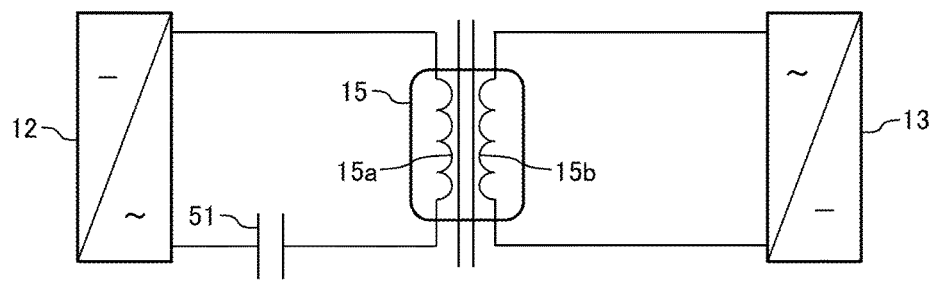
Figure 19C:
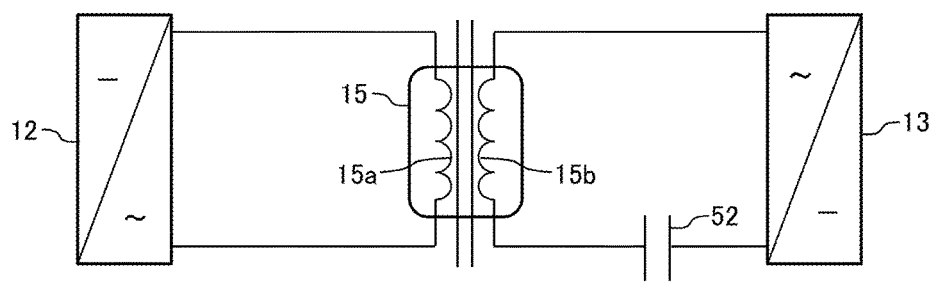

(3) Moreover, in each above-discussed embodiment, a capacitor may be inserted between the AC-DC converters 12, 13 and the high-frequency transformer 15. FIG. 19A shows an example where a capacitor 51 is inserted between the AC-DC converter 12 and the primary winding 15*a* while a capacitor 52 is inserted between the AC-DC converter 13 and the secondary winding 15*b*. FIG. 19B shows an example where the capacitor 51 is inserted between the AC-DC converter 12 and the primary winding 15*a*. FIG. 19C shows an example where the capacitor 52 is inserted between the AC-DC converter 13 and the secondary winding 15*b*. Besides, each above-discussed embodiment may be employed the high-frequency transformer 15 as designed to generate leakage inductance intentionally.

(4) What is more, the method of connecting the converter cells 20-1 to 20-N is not limited to that of each above-discussed embodiment. The connection method is not necessarily limited as long as a "converter cell in which the voltage relative to the primary-side reference potential between the primary-side terminals 25, 26 or between the primary-side terminals 45, 46 is the highest among the converter cells" is different from a "converter cell in which the voltage relative to the secondary-side reference potential between the secondary-side terminals 27, 28 is the highest among the converter cells."

For example, in the first embodiment (see FIG. 1), the "converter cell in which the voltage relative to the primary-side reference potential between the primary-side terminals 25, 26 is the highest among the converter cells" is the converter cell 20-N connected to the terminal 35, while the "converter cell in which the voltage relative to the secondary-side reference potential between the secondary-side terminals 27, 28 is the highest among the converter cells" is the converter cell 20-1 connected to the terminal 36. However, the latter converter cell is not limited to the converter cell 20-1, and may be changed to one of the converter cells 20-2 to 20-(N−1). In this modification, the highest value (absolute value) of the transformer potential difference $V_{tr}[k]$ is higher than that thereof in the first embodiment (that is to say, $\pm(1+1/N)V_{max}$). However, the highest value (absolute value) of the transformer potential difference $V_{tr}[k]$ in this modification can be made lower than the highest value (that is to say, $\pm 2V_{max}$) thereof in the comparative example (see FIG. 5). Thus, this modification is more advantageous than the comparative example in terms of being capable of constructing the converter cell 20-*k* in a smaller size and at a lower cost.

REFERENCE SIGNS LIST

1: power conversion device
11: AC-DC converter (first AC-DC converter, primary-side converter)
12: AC-DC converter (second AC-DC converter, primary-side converter)
13: AC-DC converter (third AC-DC converter, secondary-side converter)
14: AC-DC converter (fourth AC-DC converter, secondary-side converter)
15: high-frequency transformer (trans)
15*a*: primary winding
15*b*: secondary winding
20-1 to 20-N: converter cell
25, 26: primary-side terminal
27, 28: secondary-side terminal
31: primary-side power supply system
32: secondary-side power supply system
40-1 to 40-N: converter cell
45, 46: primary-side terminal
61: primary-side DC power supply system
200, 250, 260, 300: power conversion device $V_{dc1}$: primary-side DC link voltage (primary-side DC voltage)

$V_{dc2}$: secondary-side DC link voltage (secondary-side DC voltage)

The invention claimed is:

1. A power conversion device comprising: a plurality of N converter cells, each converter cell including a pair of primary-side terminals and a pair of secondary-side terminals, the converter cell transmitting power between the pair of primary-side terminals and the pair of secondary-side terminals, wherein the plurality of N converter cells are connected in series to a primary-side power supply system via the primary-side terminals of each of the plurality of N converter cells, the plurality of N converter cells are connected in series to a secondary-side power supply system via the secondary-side terminals of each of the plurality of N converter cells, and among the plurality of N converter cells, the converter cell having the highest absolute value of a ground voltage on the pair of primary-side terminals is different from the converter cell having the highest absolute value of a ground voltage on the pair of secondary-side terminals, and in the converter cell in which the absolute value of the ground voltage appearing between the pair of primary-side terminals is the j-th highest (1 less than or equal to j less than or equal to N) among the plurality of N converter cells, the absolute value of the ground voltage appearing between the pair of secondary-side terminals is the (N+1-j)-th highest among the multiple converter cells.

2. The power conversion device according to claim 1, wherein the converter cells each include
   a transformer which transmits power between primary and secondary windings at a frequency of 100 Hz or more,
   a primary-side converter which transmits power between the primary-side terminal and the primary winding while converting the frequency, and
   a secondary-side converter which transmits power between the secondary-side terminal and the secondary winding while converting the frequency.

3. The power conversion device according to claim 2, wherein
   the primary- and secondary-side power supply systems each are an AC power supply system,
   the primary-side converter includes
      a first AC-DC converter which transmits power between an AC voltage appearing in the pair of primary-side terminals and a primary-side DC voltage, and
      a second AC-DC converter which transmits power between the primary-side DC voltage and the primary winding, and
   the secondary-side converter includes
      a third AC-DC converter which transmits power between the secondary winding and a secondary-side DC voltage, and
      a fourth AC-DC converter which transmits power between the secondary-side DC voltage and an AC voltage appearing in the pair of secondary-side terminals.

4. The power conversion device according to claim 2, wherein
   the primary-side power supply system is a DC power supply system, while the secondary-side power supply system is an AC power supply system,
   the primary-side converter transmits power between a DC voltage appearing in the pair of primary-side terminals and the primary winding, and
   the secondary-side converter includes
      a third AC-DC converter which transmits power between the secondary winding and a secondary-side DC voltage, and
      a fourth AC-DC converter which transmits power between the secondary-side DC voltage and an AC voltage appearing in the pair of secondary-side terminals.

5. A power conversion device connection method, applied to a power conversion device including a plurality of N converter cells, each converter cell including a pair of primary-side terminals and a pair of secondary-side terminals, the converter cell transmitting power between the pair of primary-side terminals and the pair of secondary-side terminals, the power conversion device connection method comprising: connecting the plurality of N converter cells in series to a primary-side power supply system via the primary-side terminals of each of the plurality of N converter cells, and connecting the plurality of N converter cells in series to a secondary-side power supply system via the secondary-side terminals of each of the plurality of N converter cells, such that the converter cell having the highest absolute value of a ground voltage on its pair of primary-side terminals is different from the converter cell having the highest absolute value of a ground voltage on its pair of secondary-side terminals, wherein in the converter cell in which the absolute value of the ground voltage appearing between the pair of primary-side terminals is the j-th highest ($1 \leq j \leq N$) among the plurality of N converter cells, the absolute value of the ground voltage appearing between the pair of secondary-side terminals is the (N+1-j)-th highest among the plurality of N converter cells.

* * * * *